(12) United States Patent
Shirai

(10) Patent No.: US 8,358,244 B2
(45) Date of Patent: Jan. 22, 2013

(54) MULTIPATH SIGNAL EVALUATION METHOD, POSITION CALCULATION METHOD, AND MULTIPATH SIGNAL EVALUATION DEVICE

(75) Inventor: Tsubasa Shirai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 237 days.

(21) Appl. No.: 12/824,124

(22) Filed: Jun. 25, 2010

(65) Prior Publication Data

US 2010/0328151 A1   Dec. 30, 2010

(30) Foreign Application Priority Data

Jun. 26, 2009   (JP) .................................. 2009-152535

(51) Int. Cl.
*G01S 19/22*   (2010.01)

(52) U.S. Cl. .................................................. 342/357.61

(58) Field of Classification Search .............. 342/357.61
See application file for complete search history.

(56) References Cited

U.S. PATENT DOCUMENTS

2009/0213912 A1*   8/2009   Brenner ........................ 375/150

FOREIGN PATENT DOCUMENTS

| JP | 2005-207815 A | 8/2005 |
| JP | 2008-170214 A | 7/2008 |

* cited by examiner

*Primary Examiner* — Harry Liu
(74) *Attorney, Agent, or Firm* — Kilpatrick Townsend & Stockton LLP

(57) ABSTRACT

A multipath signal evaluation method includes, carrying out a correlation calculation on a received signal from a positioning satellite to obtain a peak correlation value, and determining reliability for a received multipath signal by using the peak correlation value and a correlation value at a phase delayed from a peak phase in which the peak correlation is obtained.

8 Claims, 28 Drawing Sheets

| ΔPL VALUE | MULTIPATH SIGNAL RELIABILITY |
|---|---|
| ΔPL ≥ THRESHOLD VALUE | HIGH |
| ΔPL < THRESHOLD VALUE | LOW |

FIG.25

| GPS SATELLITE | DETERMINATION RANGE A (FLAG F1) | | DETERMINATION RANGE B (FLAG F2) | | DETERMINATION RANGE C (FLAG F3) | |
|---|---|---|---|---|---|---|
| | CENTER VALUE | WIDTH | CENTER VALUE | WIDTH | CENTER VALUE | WIDTH |
| S1 | 4 | 6 | 110 | 20 | 110 | 20 |
| S2 | 1 | 6 | 125 | 20 | 125 | 20 |
| S3 | 8 | 6 | 118 | 20 | 118 | 20 |
| ⋮ | ⋮ | ⋮ | ⋮ | ⋮ | ⋮ | ⋮ |

457

| | MULTIPATH SIGNAL RELIABILITY | ERROR MODEL EXPRESSION |
|---|---|---|
| $\Delta PE \geqq 0$ | HIGH ($\Delta PL \geqq$ THRESHOLD VALUE) | $ERR = a_1 \cdot \Delta PE + b_1$ |
| | LOW ($\Delta PL <$ THRESHOLD VALUE) | $ERR = a_2 \cdot \Delta PE + b_2$ |
| $\Delta PE < 0$ | HIGH ($\Delta PL \geqq$ THRESHOLD VALUE) | $ERR = a_3 \cdot \Delta PE + b_3$ |
| | LOW ($\Delta PL <$ THRESHOLD VALUE) | $ERR = a_4 \cdot \Delta PE + b_4$ |

MULTIPATH SIGNAL EVALUATION METHOD, POSITION CALCULATION METHOD, AND MULTIPATH SIGNAL EVALUATION DEVICE

This application claims priority to Japanese Patent Application No. 2009-152535, filed Jun. 26, 2009, the entirety of which is hereby incorporated by reference.

BACKGROUND

1. Technical Field

The present invention relates to a multipath signal reliability determination method, a code phase error calculation method, a code phase calculation method, a position calculation method, and a multipath signal reliability determination device.

2. Related Art

A GPS (Global Positioning System) is widely known as a positioning system using positioning signals and is built into mobile phones, car navigation systems, and the like. The GPS carries out positioning calculation processing to obtain the position of a position calculation device on the basis of information regarding the positions of a plurality of GPS satellites or the pseudo distance between the respective GPS satellites and the position calculation device.

Multipath is one of the main factors which cause errors in position calculation using positioning signals. An environment where multipath occurs is referred to as "multipath environment". The multipath environment means an environment where indirect wave signals, such as waves reflected from buildings, the ground, or the like, transmission waves transmitted through obstacles, and diffraction waves diffracted by obstacles, are superimposed on direct wave signals transmitted from a signal generation source of the positioning signals (in the case of GPS, GPS satellites), and are received as multipath signals. Under this environment, indirect waves appear as error signals, making it difficult to decode codes.

In order to solve the problems regarding the errors due to multipath, for example, JP-A-2008-170214 describes a technique to determine a positioning satellite that has a high probability of having multipath influence as an unsuitable positioning satellite, so to be able to calculate the position by excluding the unsuitable positioning satellite.

One way to deal with multipath is to calculate a position by excluding a multipath signal from acquired positioning signals. However, in an urban canyon environment where tall buildings are adjacent to each other, most of received positioning signals may be multipath signals, and if all the multipath signals are excluded, the number of satellites necessary for position calculation may not be secured. For this reason, there is a demand in position calculation to use positioning signals that are reliable enough for use in the position calculation, despite these signals may all be multipath signals.

SUMMARY

An advantage of some aspects of the invention is that it provides a new method of determining quality of a multipath signal. The terms "multipath signal", "multipath wave", "indirect signal" or "indirect wave" may be used herein to represent a signal that is not a directly-received signal.

A first aspect of the invention provides a multipath signal reliability determination method. The multipath signal reliability determination method includes executing a correlation calculation on a received signal from a positioning satellite, and if the received signal is a multipath signal, determining reliability of the multipath signal using a peak correlation value obtained by the correlation calculation and a correlation value at a phase delayed from a peak correlation phase.

Another aspect of the invention provides a multipath signal reliability determination device. The multipath signal reliability determination device includes a correlator which carries out correlation calculation for a reception signal received from a satellite signal transmitted from a position calculation satellite, and a determination unit which, when the reception signal is a multipath signal, determines reliability of the multipath signal by using a peak correlation value obtained by the correlation calculation and a correlation value at a phase delayed from a peak correlation phase by a predetermined phase.

With the first aspect and the like, correlation calculation is carried out for the reception signal received from the satellite signal transmitted from the position calculation satellite. Then, when the reception signal is a multipath signal, reliability of the multipath signal is determined by using the peak correlation value obtained by the correlation calculation and the correlation value at the phase delayed from the peak phase representing the peak correlation value by the predetermined phase.

A multipath signal is a signal where an indirect wave signal, such as reflection waves reflected by buildings, the ground, or the like, transmission waves transmitted through obstacles, or diffraction waves diffracted by obstacles, is superimposed on an indirect wave signal which is a satellite signal transmitted from a positioning satellite. The propagation distance of an indirect wave signal from a positioning satellite to a receiver is longer than that of a direct wave signal, such that the indirect wave signal is delayed with respect to the direct wave signal. For this reason, when a reception signal is a multipath signal, the effect of the indirect wave signal strongly appears at a phase delayed from a peak phase, and the absolute value of the correlation value increases. By referencing a peak correlation value and a correlation value at a phase delayed in a predetermined amount from the peak phase, a degree of the effect of the indirect wave signal on a direct wave signal is known to determine quality of a multipath signal.

A second aspect of the invention provides the multipath signal reliability determination method of the first aspect, wherein the predetermined phase is equal to or larger than 1 chip and smaller than 2 chips.

With the second aspect, reliability of a multipath signal is determined by using a phase delayed from a peak phase by the amount equal to or larger than 1 chip and smaller than 2 chips as a predetermined phase. The inventors have found experimentally that the effect of an indirect wave signal is easily determined for a correlation value at a phase delayed from a peak phase by the amount equal to or larger than 1 chip and smaller than 2 chips, as compared with a correlation value at a phase delayed from a peak phase by the amount smaller than 1 chip or equal to or larger than 2 chips. For this reason, it is more preferably to determine reliability of a multipath signal by using a correlation value at a phase delayed from a peak phase by the amount equal to or larger than 1 chip and smaller than 2 chips.

A third aspect of the invention provides a code phase error calculation method. The code phase error calculation method includes carrying out the multipath signal reliability determination method of the first or second aspect, determining whether the indirect wave signal indirectly received from the satellite signal heightens or lowers the correlation value with respect to a direct wave signal directly received from the satellite signal using the peak correlation value and a correlation value at a phase advanced from the phase with the peak correlation, and calculating an error included in a code phase obtained from the result of the correlation calculation by using an error calculation method determined in accordance with the reliability and the determined state.

According to the third aspect of the invention, whether the indirect wave signal heightens or lowers the correlation value is determined in accordance with delay of the indirect wave signal with respect to the direct wave signal using the peak correlation value and the correlation value at the phase advanced from the phase of the peak correlation. Then, the error in the code phase obtained from the result of the correlation calculation is calculated by using the error calculation method determined in accordance with reliability of the multipath signal and the determined state of either heightening or lowering the correlation value.

Although details will be described below, it has been found that the phase difference between the direct wave signal and the indirect wave signal is associated with a status change of whether the correlation value gets heightened or lowered, and the status change causes a change in the sign of the code phase error. It has also been found that the width (amplitude) of the change in the code phase error changes depending on the differences in reliability of the multipath signal. Thus, the code phase error can be appropriately calculated by varying the error calculation method in accordance with reliability of the multipath signal and the state of either heightening/lowering of the correlation value.

A fourth aspect of the invention provides a code phase calculation method. The code phase calculation method includes carrying out the code phase error calculation method of the third aspect, and calculating a corrected code phase of a code phase obtained from the result of the correlation calculation by using an error of the code phase obtained by the code phase error calculation method.

With the fourth aspect, the corrected code phase of the code phase obtained from the result of the correlation calculation is calculated by using the error of the code phase obtained by the code phase error calculation method of the third aspect. Therefore, position calculation can be carried out by using a more accurate corrected code phase where an error has been corrected, and thus accuracy of position calculation is improved.

A fifth aspect of the invention provides a position calculation method. The position calculation method includes receiving satellite signals from a plurality of position calculation satellites, carrying out the multipath signal reliability determination method of the first or second aspect for respective reception signals of the satellite signals, selecting the satellite signals for use in position calculation by using reliability obtained by carrying out the multipath signal reliability determination method, and carrying out position calculation by using reception signals of the selected satellite signals.

With the fifth aspect, the satellite signal for use in position calculation is selected by using reliability obtained by the multipath signal reliability determination method of the first or second aspect. Then, position calculation is carried out by using the reception signal of the selected satellite signal. For example, when the number of satellites necessary for position calculation is insufficient, a satellite signal having high reliability from among satellite signals which are determined to be multipath signals is used for position calculation. Therefore, even in an environment where, if multipath signals are excluded, a sufficient number of satellites may not be secured, position calculation can be carried out by using a satellite signal which is a multipath signal but has high reliability.

BRIEF DESCRIPTION OF THE DRAWINGS

The invention will be described with reference to the accompanying drawings, wherein like members reference like elements.

FIG. 25 is an explanatory view illustrating a determination method of reliability of a multipath signal.

FIG. 33 is a diagram showing the data configuration of an error model expression table.

DESCRIPTION OF EXEMPLARY EMBODIMENTS

Figure 1:
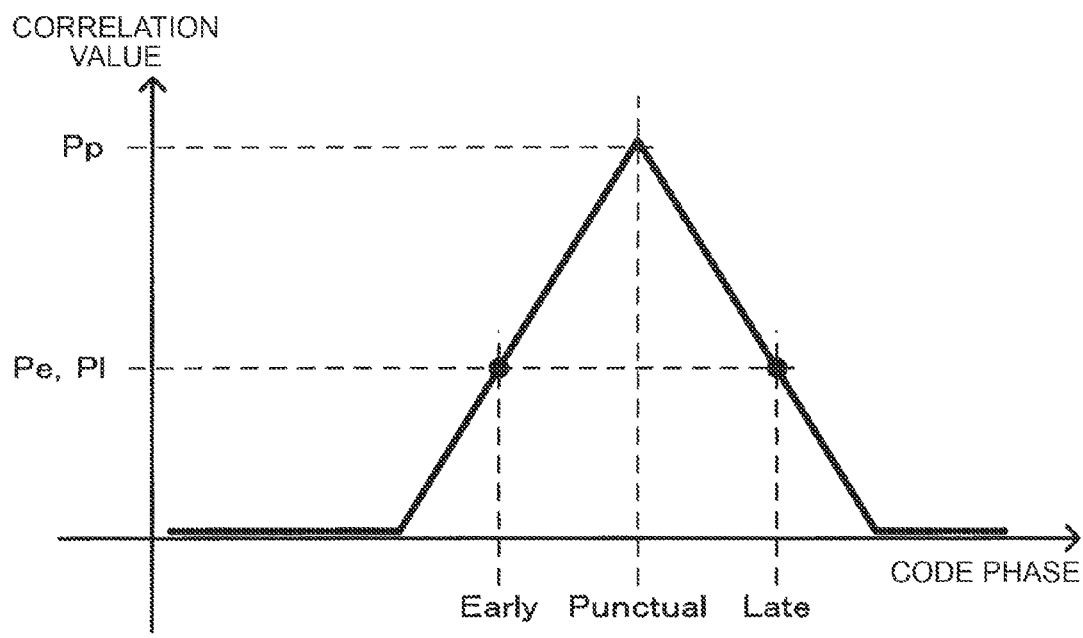
FIG. 1 is an explanatory view illustrating peak detection of correlation values.

Hereinafter, an exemplary embodiment of the invention will be described with reference to the drawings. Hereinafter, a case where the invention is applied to a mobile phone including a GPS receiver will be described. In this embodiment, a GPS receiver functions as a multipath signal detection device which detects a multipath signal, and also functions as a multipath signal reliability determination device which, when a reception signal is a multipath signal, determines reliability of the multipath signal. It should be noted that the invention is not limited to this embodiment.

Principle (A) Detection of Multipath Signal

First of all, the principle of detection of a multipath signal will be described. The GPS receiver captures a GPS satellite signal serving as a positioning signal transmitted from a GPS satellite, which is a kind of positioning satellite, by spread codes called C/A codes. Specifically, the GPS satellite signal is a communication signal at 1.57542 [GHz] which is modulated by a direct spectrum spread system using C/A (Coarse and Acquisition) codes, which are modulation codes uniquely allocated to the respective GPS satellites. The C/A codes are pseudo random noise signals in 1 ms iteration cycles with a code length of 1023 chip as a 1PN frame.

A correlation arithmetic operation is carried out between the reception signal of the GPS satellite signal and the replica codes which simulate the C/A codes of the GPS satellite signal (hereinafter, referred to as "capture-target satellite signal") of the GPS satellite (hereinafter, referred to as "capture-target satellite") as the target of capture. The correlation arithmetic operation is carried out while shifting the frequency and phase of the replica codes. The correlation value obtained by the correlation arithmetic operation is maximized when the frequency of the replica codes is identical to the frequency of the reception signal and when the phase of the replica codes is identical to the phase of the reception signal. The phase of the C/A codes and carrier wave frequency (Doppler frequency) included in the GPS satellite signal are obtained through detection of the phase and frequency at which the correlation value is maximized, and the GPS satellite signal is thus captured.

The C/A codes have different codes specified for each GPS satellite in advance. Thus, a desired GPS satellite signal can be separated and captured from the reception signal. When the maximum correlation value does not reach a predetermined value, the correlation value is determined not to be a peak value, and it is determined that the reception signal is not a capture-target satellite signal. In this case, a correlation arithmetic operation is carried out again for other capture-target satellites to attempt signal capture.

The GPS satellite constantly changes its position, and the distance (that is, pseudo distance) between the GPS satellite and the GPS receiver changes accordingly. For this reason, to cope with the change in the pseudo distance, the GPS receiver carries out processing for tracking the captured GPS satellite signal.

Figure 2:
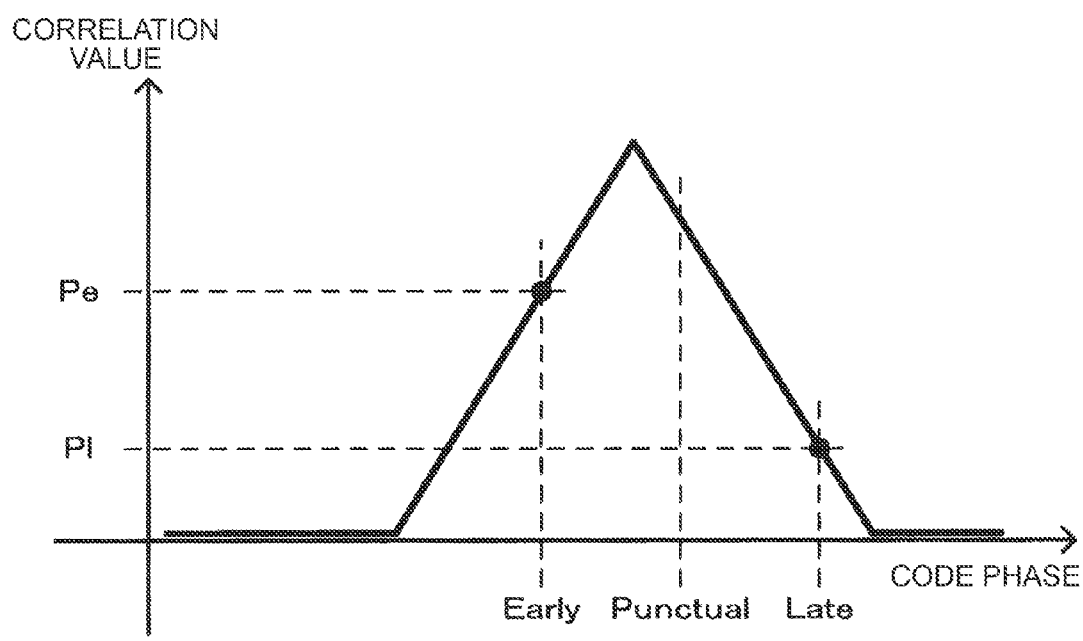
FIG. 2 is an explanatory view illustrating peak detection of correlation values.
Figure 3:
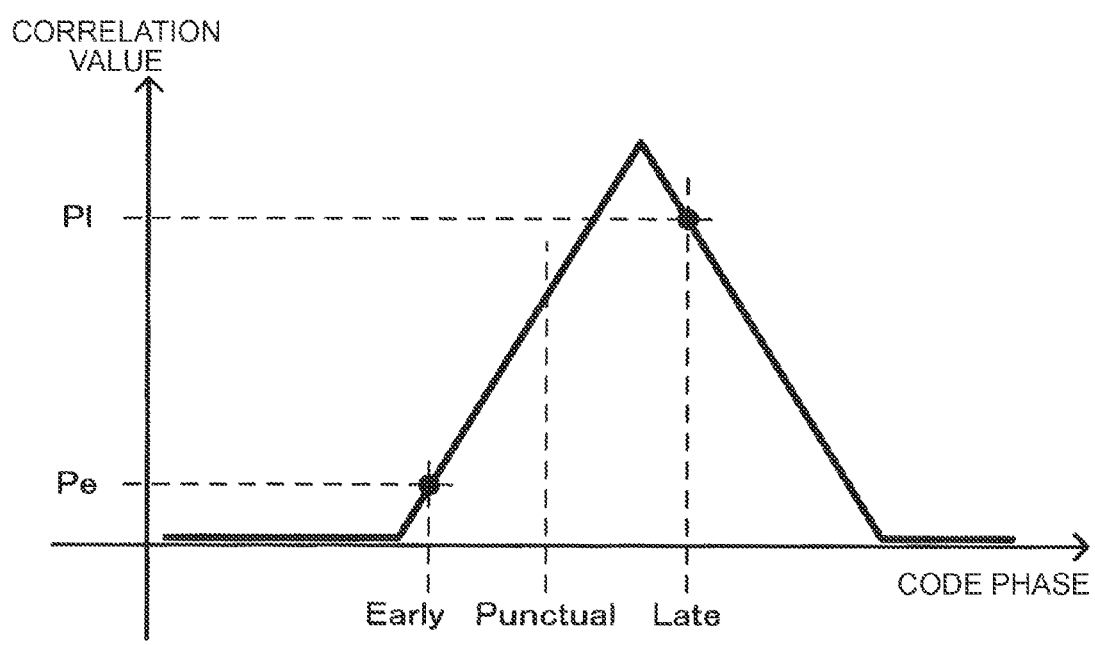
FIG. 3 is an explanatory view illustrating peak detection of correlation values.

FIGS. 1 to 3 are diagrams illustrating detection of a phase (hereinafter, referred to as "peak phase") at which the correlation value is maximized (peak). FIG. 1 shows an example of self-correlation values of C/A codes with the horizontal axis representing a code phase and the vertical axis representing a correlation value. In the following description, the correlation value means the magnitude (absolute value) of the correlation value.

The self-correlation values of the C/A codes are represented by a substantially symmetrical triangular shape having the peak value at the top. That is, the correlation value at the phase delayed from the peak phase and the correlation value at the phase advanced from the peak phase by the same amount are equivalent to each other.

Accordingly, the correlation values are calculated at the phase (hereinafter, referred to as "early phase") advanced by a predetermined amount from a code phase (hereinafter, referred to as "punctual phase") which is a currently tracking target and the phase (hereinafter, referred to as "late phase") delayed from the code phase by the predetermined amount. The predetermined amount may be, for example, ⅓ chip. Then, the punctual phase is controlled such that a correlation value (hereinafter, referred to as "late correlation value") Pl at the late phase and a correlation value (hereinafter, referred to as "early correlation value") Pe at the early phase become equal to each other.

Specifically, as shown in FIG. 1, when the early correlation value Pe and the late correlation value Pl are equal to each other, it is considered that the punctual Pp coincides with the peak phase. As shown in FIG. 2, when the early correlation value Pe is larger than the late correlation value Pl, the punctual phase is delayed from the peak phase. In this case, the punctual phase is advanced. As shown in FIG. 3, when the early correlation value Pe is smaller than the late correlation value Pl, the punctual phase is advanced from the peak phase. In this case, the punctual phase is delayed. In the following description, the term "punctual phase" means that the early correlation value Pe and the late correlation value Pl are equal to each other, that is, the punctual phase which is considered to coincide with the peak phase.

In the multipath environment, the signal (reception signal) received by the GPS receiver is a signal (multipath signal) where an indirect wave signal, such as reflection waves reflected by building, the ground, or the like, transmission waves transmitted through obstacles, or diffraction waves diffracted by obstacles, is superimposed on a direct wave signal which is a GPS satellite signal transmitted from a GPS satellite.

Figure 4:
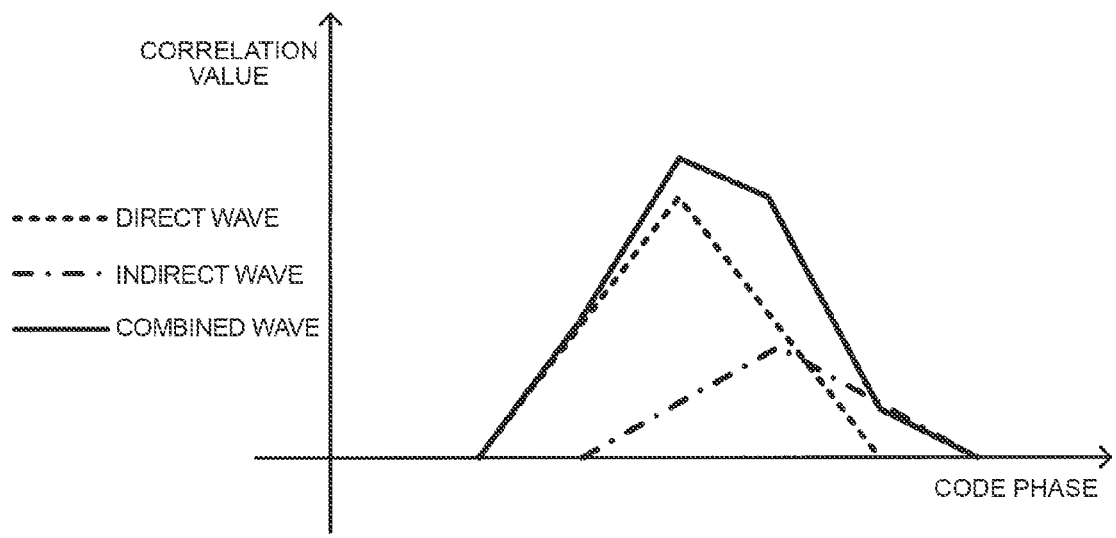
FIG. 4 is a diagram showing a correlation result of a multipath signal.

FIG. 4 is a diagram showing a correlation result of a multipath signal. Specifically, FIG. 4 is a graph showing correlation values of a direct wave signal, an indirect wave signal, and a multipath signal where the direct wave signal and the indirect wave signal are combined with (superimposed on) each other. In FIG. 4, the horizontal axis represents a code phase, and the vertical axis represents a correlation value.

Similarly to the correlation value of the direct wave signal, the correlation value of the indirect wave signal has a substantially symmetrical triangular shape. However, the peak value (peak correlation value) of the correlation value of the indirect wave signal is smaller than the correlation peak value of the direct wave signal. This is because the signal intensity of the GPS satellite signal transmitted from the GPS satellite has been weakened at the time of reception compared to at the time of transmission due to being reflected by buildings or the ground, transmitted through obstacles, or the like.

The peak phase of the indirect wave signal is delayed from the peak phase of the direct wave signal. This is because the GPS satellite signal transmitted from the GPS satellite is reflected by buildings or the ground, diffracted by obstacles, or the like, and the propagation distance from the GPS satellite to the GPS receiver is extended.

Figure 5:
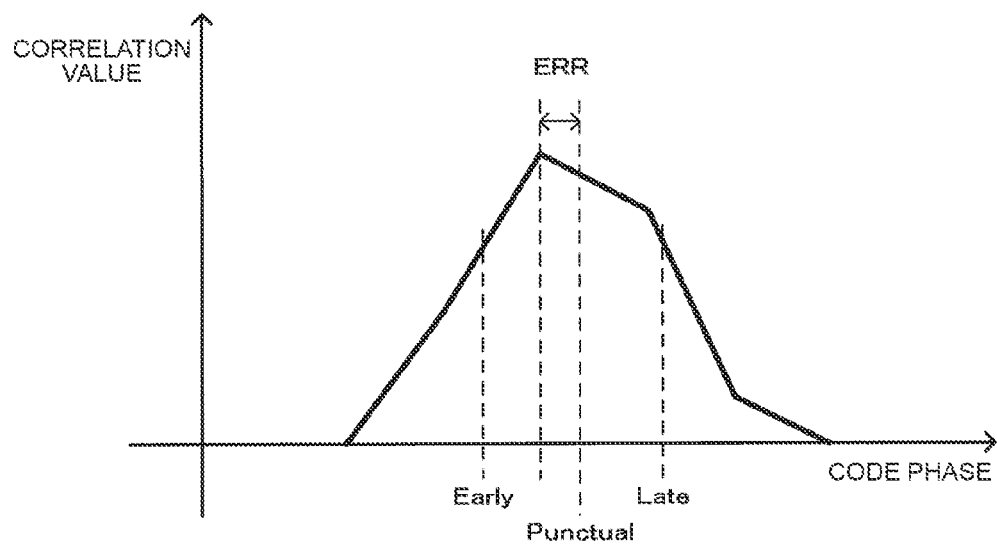
FIG. 5 is an explanatory view illustrating a code phase error ERR.

The correlation value of the multipath signal is the sum of the correlation value of the direct wave signal and the correlation value of the indirect wave signal, such that the triangular shape is distorted and becomes asymmetric with respect to the peak value as the center. For this reason, as shown in FIG. 5, the punctual phase of the multipath signal does not coincide with the peak phase. The phase difference between the peak phase and the punctual phase is hereinafter referred to as "code phase error" and represented by "ERR". The sign of the code phase error when the punctual phase is delayed from the peak phase is defined as "positive", and the sign of the code phase error when the punctual phase is advanced from the peak phase is defined as "negative". The positive/negative sign of the code phase error changes depending on the type of interference of the direct wave signal and the indirect wave signal due to the phase difference between the direct wave signal and the indirect wave signal, that is, depending on whether the direct wave signal and the indirect wave signal strengthen each other or heightening the peak correlation value as a result (so-called incremental interference), or weaken each other or lowering the peak correlation value as a result (so-called decremental interference).

Figure 6:
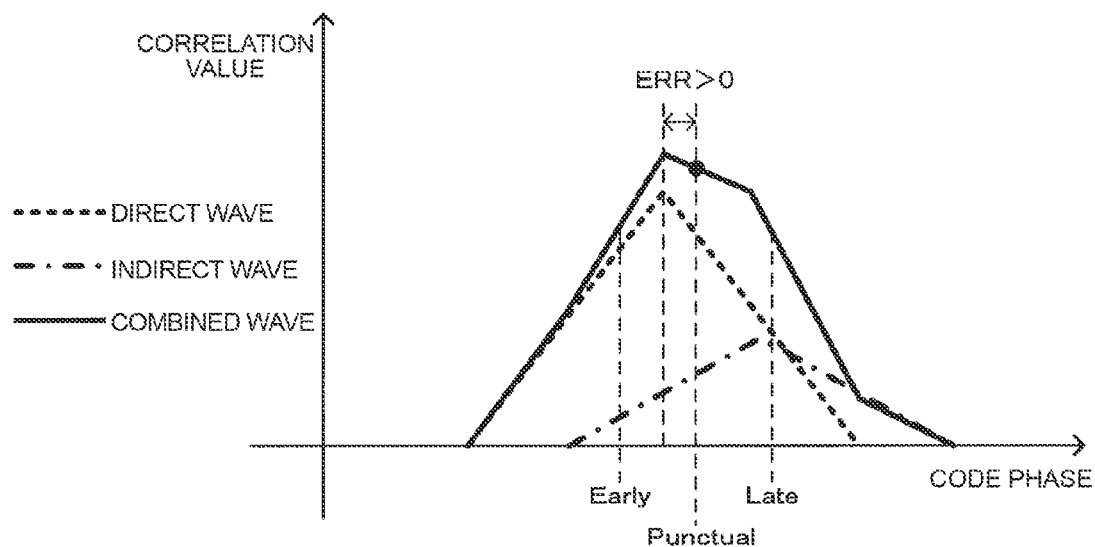
FIG. 6 is an explanatory view illustrating a code phase error ERR.
Figure 7:
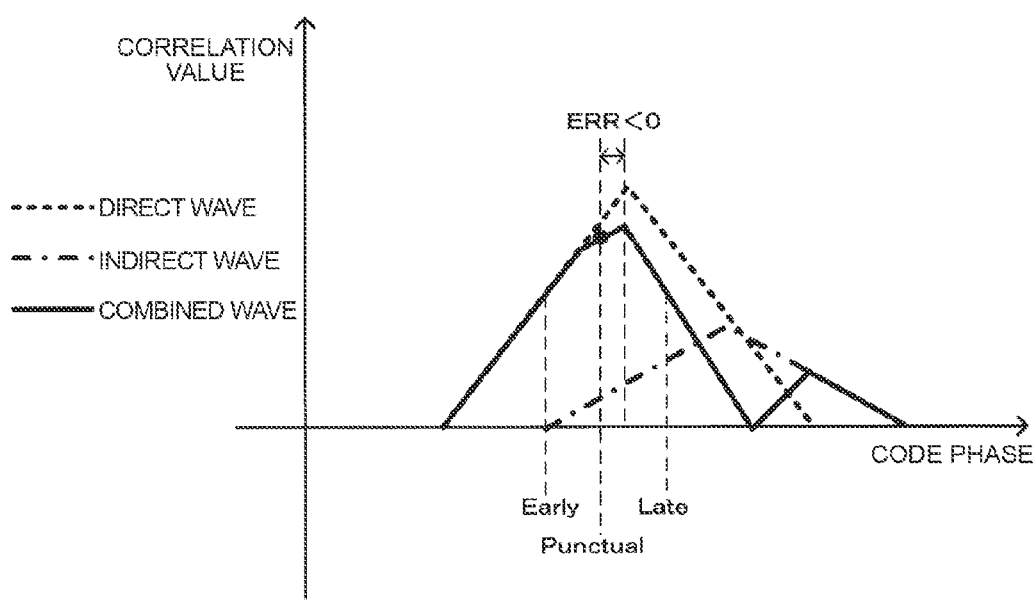
FIG. 7 is an explanatory view illustrating a code phase error ERR.

FIG. 6 is a diagram showing an example of a correlation result when a direct wave signal and an indirect wave signal are in phase. FIG. 7 is a diagram showing an example of a correlation result when a direct wave signal and an indirect wave signal are in reverse phase. When a direct wave signal and an indirect wave signal which reach the GPS receiver are in phase, the direct wave signal and the indirect wave signal strengthen each other. In this case, the correlation value of the combined wave signal is expressed as the addition value of the correlation value of the direct wave signal and the correlation value of the indirect wave signal. That is, the correlation value is strengthened in accordance with delay of the indirect wave signal with respect to the direct wave signal. In this case, as shown in FIG. 6, the punctual phase is delayed from the peak phase, such that the code phase error ERR has a positive value.

Meanwhile, when the direct wave signal and the indirect wave signal which reach the GPS receiver are in reverse phase, the direct wave signal and the indirect wave signal weaken each other. In this case, the correlation value of the combined wave signal is expressed as the subtraction value obtained by subtracting the correlation value of the indirect wave signal from the correlation value of the direct wave signal. That is, the correlation value is weakened in accordance with delay of the indirect wave signal with respect to the direct wave signal. In this case, as shown in FIG. 7, the punctual phase is advanced from the peak phase, such that code phase error ERR has a negative value. When the correlation value of the indirect wave signal is larger than the correlation value of the direct wave signal, the subtraction value of the correlation value is negative; however, the absolute value is calculated, such that the subtraction value is shown as a positive value.

When the direct wave signal and the indirect wave signal strengthen each other, the correlation value of the combined wave signal is expressed as the addition value of the correlation value of the direct wave signal and the correlation value of the indirect wave signal. This means that the correlation value is strengthened. When the direct wave signal and the indirect wave signal weaken each other, the correlation value of the combined wave signal is expressed as the subtraction value obtained by subtracting the correlation value of the indirect wave signal from the correlation value of the direct wave signal. This means that the correlation value is weakened. That is, the state where the direct wave signal and the indirect wave signal strengthen or weaken each other is equivalent to the state where the correlation value is strengthened or weakened.

In this embodiment, two parameters of "PE value" and "vector angle θ" are defined. A multipath signal is detected by determining whether the reception signal is a multipath signal or not by using the two parameters.

Figure 8:
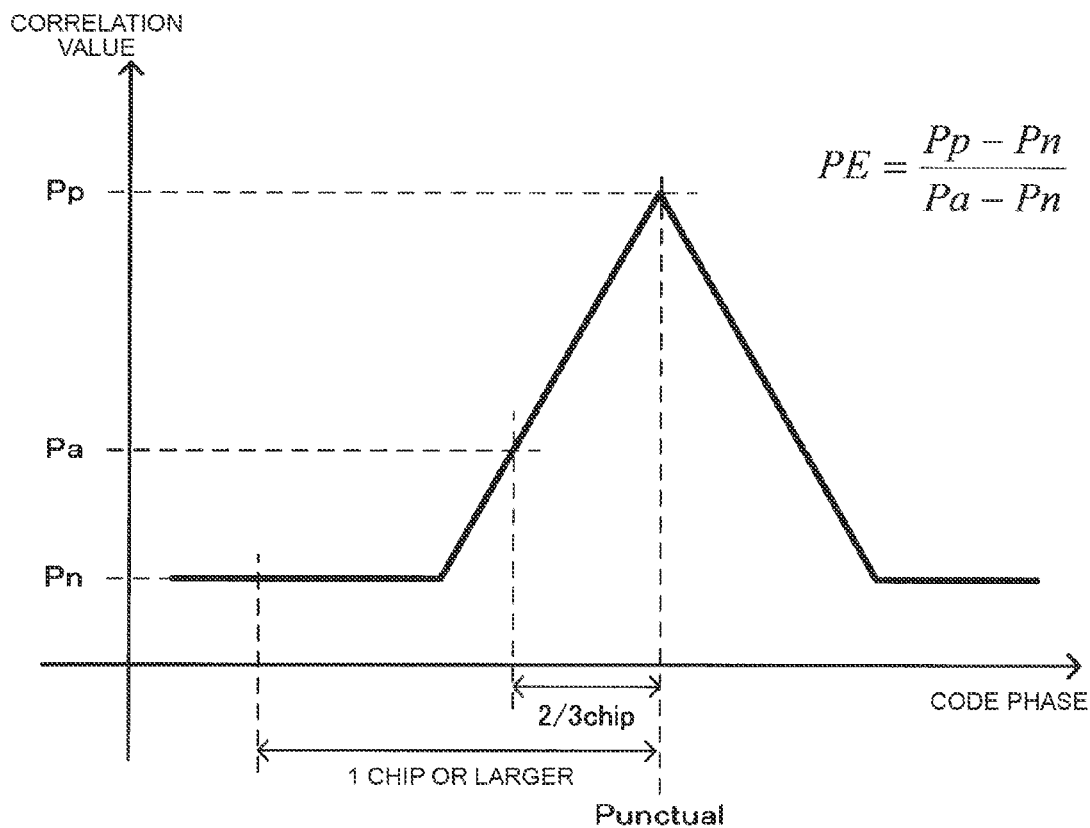
FIG. 8 is an explanatory view illustrating a calculation method of a PE value.

FIG. 8 is an explanatory view illustrating a calculation method of a PE value. FIG. 8 shows an example of a correlation result of a reception signal. In FIG. 8, the PE value is calculated by Equation (1) based on the punctual correlation value Pp, a correlation value Pn at a phase advanced from the punctual phase by 1 chip or larger, and a correlation value Pa advanced from the punctual phase by N chip.

$$PE=(Pp-Pn)/(Pa-Pn) \qquad (1)$$

In Equation (1), N is in the range of 0<N<1, and as shown in FIG. 8, N may be, for example, ⅔. That is, the PE value represents the ratio of the punctual correlation value Pp for the correlation value Pn to the correlation value Pa for the correlation value Pn. The correlation value Pn is a correlation value at a phase shifted away from the punctual phase by 1 chip or larger, such that the correlation value Pn can be referred to as a correlation value of noise floor (a correlation value of a signal which is considered to be noise).

Figure 9:
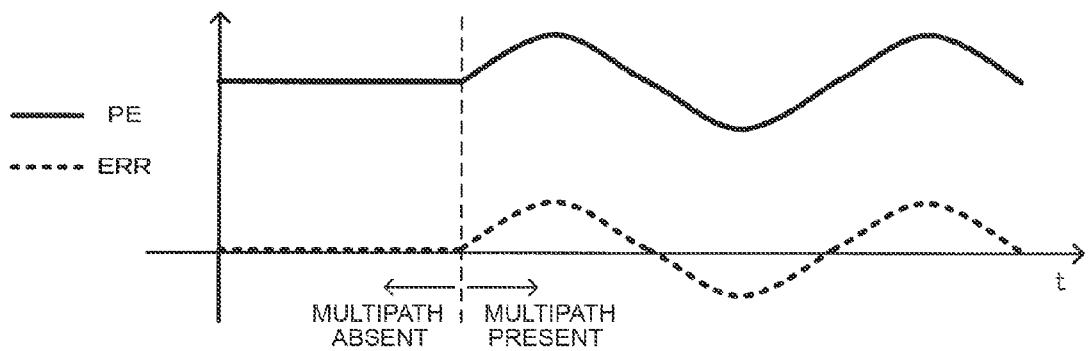
FIG. 9 is a diagram showing the relationship between a PE value and a code phase error ERR.

The inventors have found experimentally that the following relationship is established between the PE value and the code phase error ERR. FIG. 9 is a diagram showing the relationship between the PE value of the reception signal and the code phase error ERR when the multipath effect changes from "absence" to "presence". In FIG. 9 having the horizontal axis as a common time axis, the solid line indicates temporal change of the PE value, and the broken line indicates temporal change of the code phase error ERR.

Under the "absence" condition of the multipath effect, the reception signals received by the GPS receiver are only direct wave signals. In this case, the code phase error ERR is substantially 0, and the PE value is a constant value. This is because the curved shape of the correlation value of the direct wave signal does not change with the elapse of time. The PE value under the "absence" condition of the multipath effect, that is, when there are no indirect wave signals, is hereinafter referred to as "PE offset value".

The inclination of the triangle of the correlation value varies in accordance with PRN codes of the GPS satellite signal, such that the PE offset value varies between the GPS satellites. Further, the height of the triangle of the correlation value varies in accordance with the signal intensity of the GPS satellite signal, such that the PE offset value also changes in accordance with the signal intensity of the GPS satellite signal. That is, the PE offset value depends on the number of the GPS satellite and the signal intensity of the GPS satellite signal.

Meanwhile, under the "presence" condition of the multipath effect, the reception signals become multipath signals where indirect wave signals are superimposed on direct wave signals. In this case, the code phase error ERR and the PE value change with the elapse of time. This is because the shape of the correlation value of the curve of the multipath signal changes due to changes in the indirect wave signals according to the change of the relative positional relationship between the GPS satellite signal and the GPS receiver with movement of the GPS satellite or the GPS receiver. That is, the correlation values Pp and Pa of the reception signal shown in FIG. 8 change. The change in the PE value can be approximated by sin waves, and the amplitude is determined by the signal intensity relationship between the direct wave signal and the indirect wave signal or the difference between the carrier frequencies.

It can be seen from FIG. 9 that the PE value and the code phase error ERR change with the elapse of time in the substantially same manner. That is, the PE value increases as the code phase error ERR increases, and the PE value decreases as the code phase error ERR decreases. As described above, when the direct wave signal and the indirect wave signal strengthen each other, the code phase error ERR has a positive value, and when the direct wave signal and the indirect wave signal weaken each other, the code phase error ERR has a negative value. Thus, when the direct wave signal and the indirect wave signal strengthen each other, the PE value changes in an increasing direction, and when the direct wave signal and the indirect wave signal weaken each other, the PE value changes in a decreasing direction.

Figure 10:
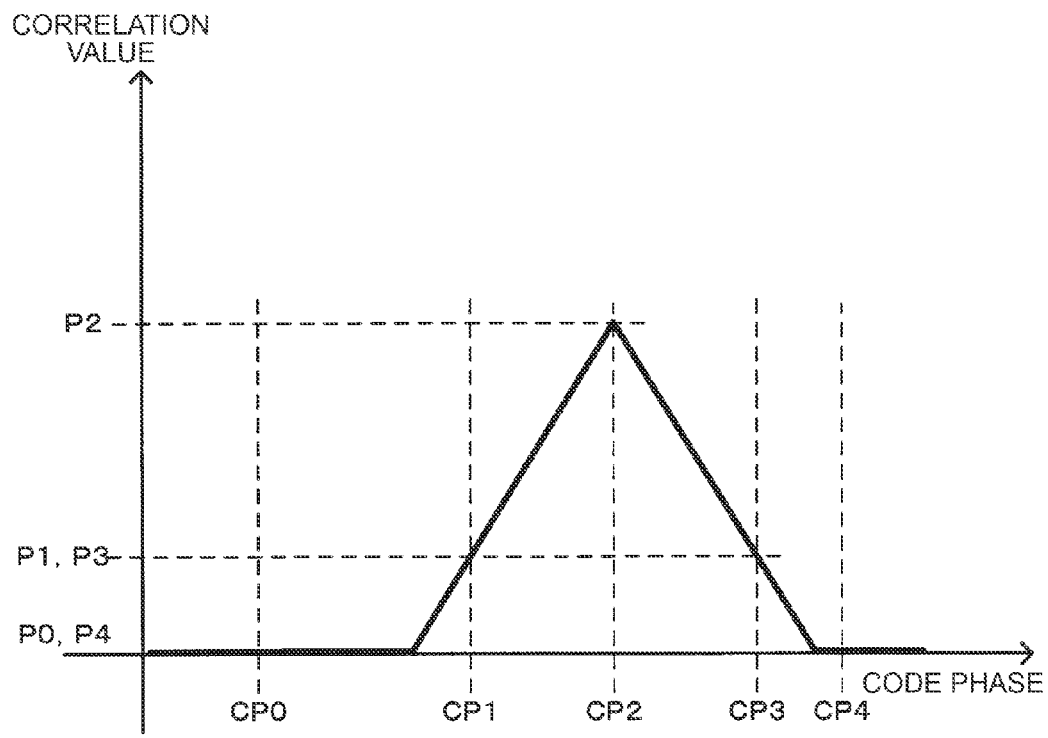
FIG. 10 is a diagram showing a correlation result of a direct wave signal.
Figure 11:
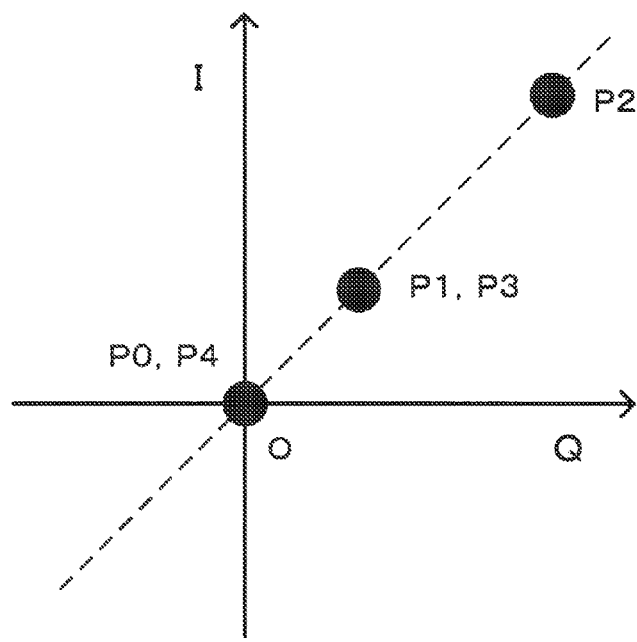
FIG. 11 is a diagram showing a correlation result of a direct wave signal.

Next, an index value called a vector angle θ is defined. The vector angle θ is defined as follows. FIGS. 10 and 11 are diagrams showing a correlation result of a direct wave signal. FIG. 10 is a graph showing the correlation value at the code phase of the direct wave signal. FIG. 11 is a diagram on which the correlation values P at the respective code phases shown in FIG. 10 are plotted on an IQ coordinate plane which has the horizontal axis representing Q components (orthogonal components) of the correlation values and the vertical axis representing I components (in-phase components) of the correlation values. The correlation value P is expressed as $P=(I^2+Q^2)^{1/2}$.

Referring to FIG. 11, the correlation value P of the direct wave signal is distributed substantially along a line passing through the origin O on the IQ coordinate plane. That is, the I and Q components of correlation values P0 and P4 at code phases CP0 and CP4 are both zero, and plotted at the origin O on the IQ coordinate plane. The I and Q components of correlation values P1 to P3 at code phases CP1 to CP3 are not zero, and thus plotted at positions away from the origin O. In particular, the correlation value P2 at the code phase (peak phase) CP2 at which the correlation value P is maximized is plotted at the furthermost position from the origin O.

That is, the correlation values P from the phase CP0 advanced from the peak phase CP2 by 1 chip or larger to the phase CP4 delayed from the phase CP0 by 1 chip or larger shift away from the origin O on the IQ coordinate plane, and reach the furthermost position at the peak phase. Then, the correlation values P again return to the origin, leaving a substantially linear trace. In FIG. 11, the substantially linear trace of the correlation values P has an angle of about 45 degrees with respect to the Q axis. However, the angle varies depending on the phase of the carrier waves of the direct wave signal, the determination method of the IQ coordinates, and the like.

Figure 12:
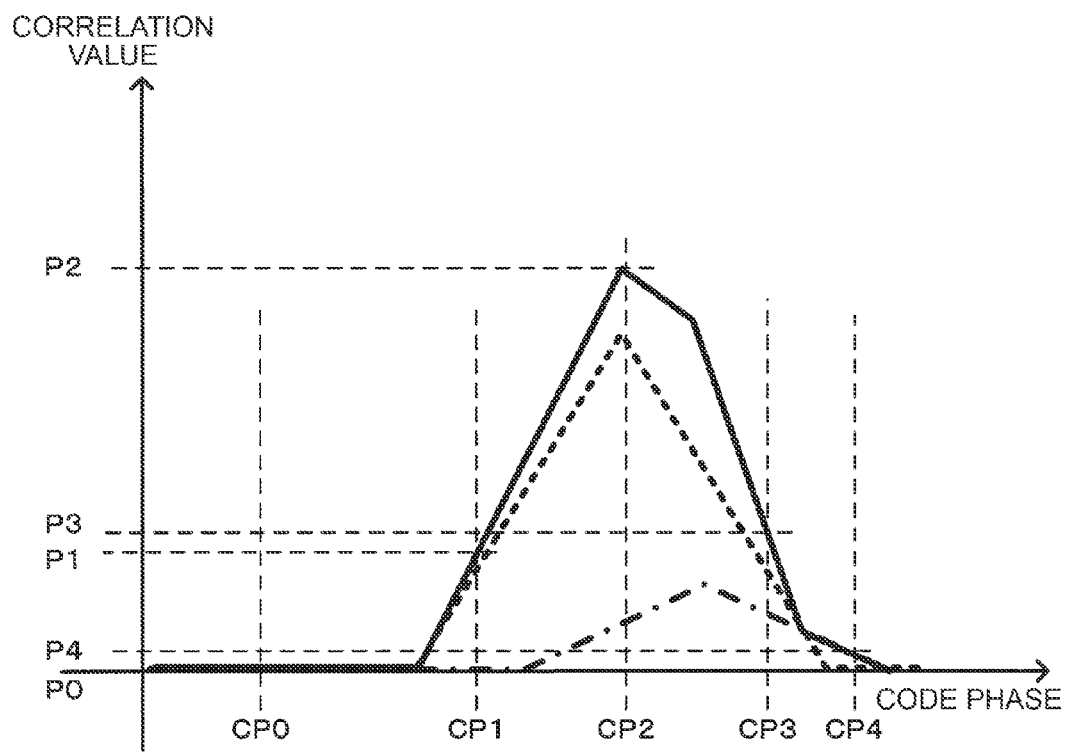
FIG. 12 is a diagram showing a correlation result of a multipath signal.
Figure 13:
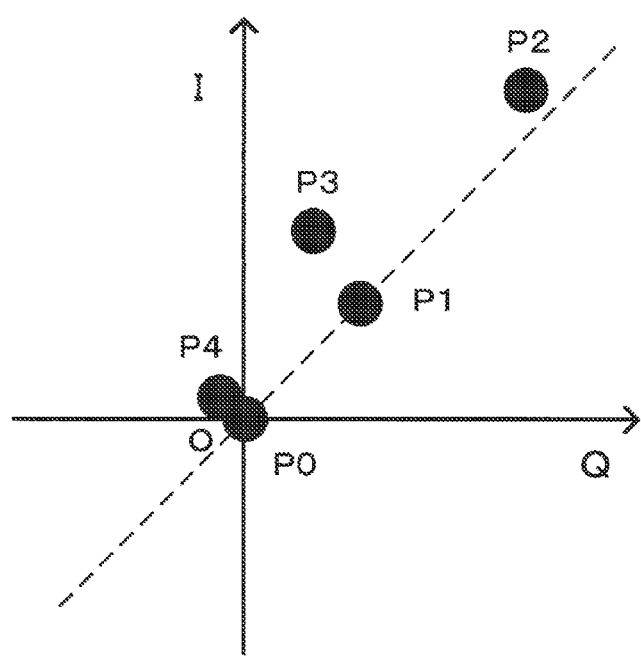
FIG. 13 is a diagram showing a correlation result of a multipath signal.

FIGS. 12 and 13 show the correlation results of the multipath signal where direct wave signals and indirect wave signals shown in FIGS. 4 and 5 are combined with each other. FIG. 12 is a graph showing the correlation value at the code phase of the multipath signal. FIG. 13 is a diagram on which the correlation values at the respective code phases shown in FIG. 12 are plotted on the IQ coordinate plane.

Referring to FIG. 13, the correlation value P of the multipath signal is distributed such that a closed curved trace can be produced on the IQ coordinate plane. That is, the I and Q components of a correlation value P0 at a code phase CP0 are both zero, and plotted at the origin O on the IQ coordinate plane. The I and Q components of correlation values P1 to P4 at code phases CP1 to CP4 are not zero, and thus plotted at positions away from the origin O. In particular, the correlation value P2 at the code phase CP2 is plotted at the furthermost position from the origin O. That is, the correlation values P of the multipath signal are shifted away from the origin O, and reach the furthermost position at the peak phase. Then, the correlation values P again return to the origin O, leaving a substantially closed curved trace.

Figure 14:
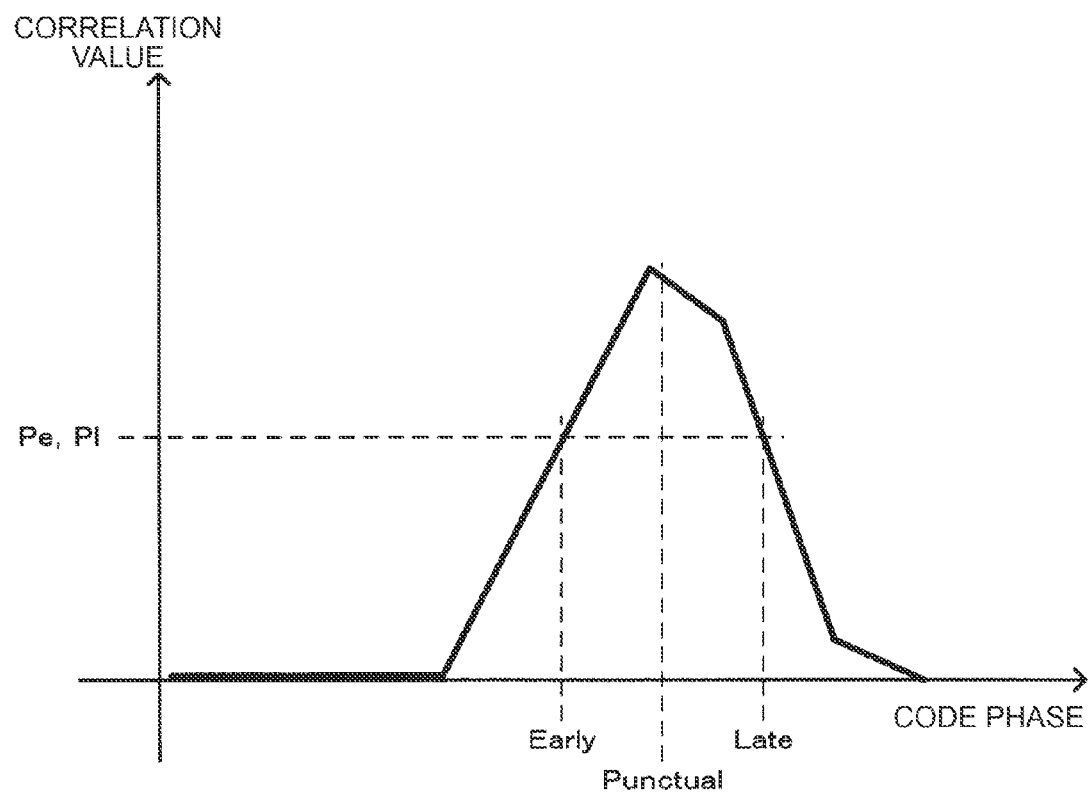
FIG. 14 is an explanatory view illustrating a vector angle.
Figure 15:
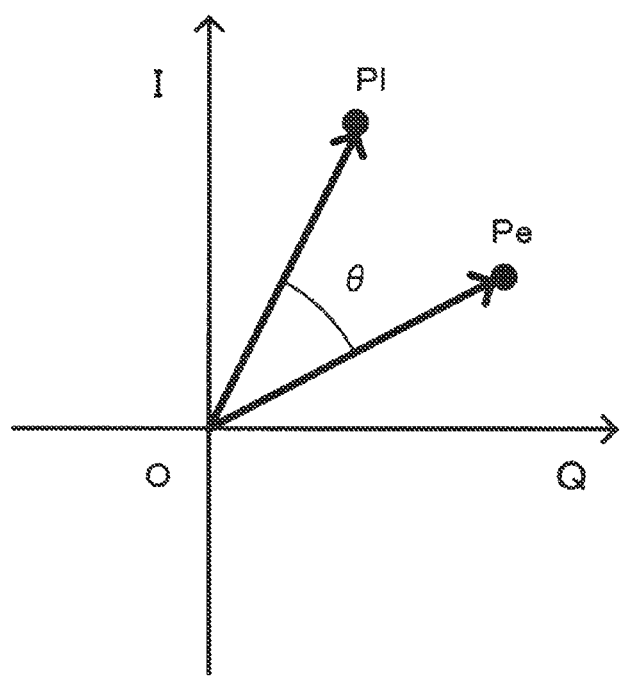
FIG. 15 is an explanatory view illustrating a vector angle.

FIGS. 14 and 15 show the early and late correlation values P from among the correlation values P of the multipath signal plotted on the IQ coordinate plane. FIG. 14 shows the correlation values of the multipath signal. FIG. 15 is a diagram on which the correlation values at the respective code phases shown in FIG. 14 are plotted on the IQ coordinate plane.

Referring to FIG. 15, a position vector directed from the origin O toward the position of the early correlation value Pe is referred to as "early correlation vector", and a position vector directed toward the position of the late correlation value Pl is referred to as "late correlation vector". An angle θ between the early correlation vector and the late correlation vector is defined as "vector angle". The correlation values Pl and Pe are equal to each other, such that the lengths of the early correlation vector and the late correlation vector on the IQ coordinate plane are equal to each other.

Figure 16:
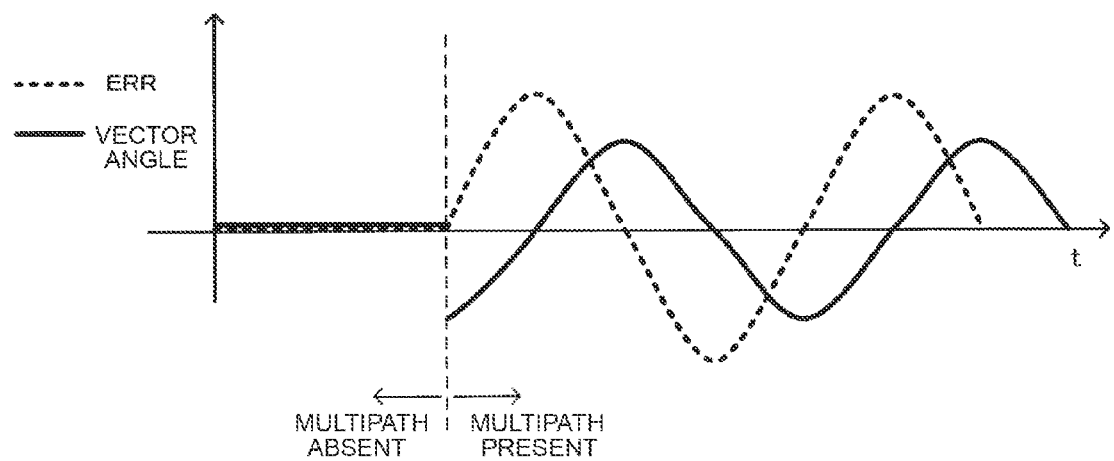
FIG. 16 is a diagram showing the relationship between a vector angle and a code phase error.

The following relationship is established between the vector angle θ and the code phase error ERR. FIG. 16 is a diagram showing the relationship between the vector angle θ and the code phase error ERR when the multipath effect changes from "presence" to "absence". In FIG. 16 having the horizontal axis as a common time axis, the solid line indicates temporal change of the vector angle θ, and the broken line indicates temporal change of the code phase error ERR.

Under the "absence" condition of the multipath effect, the reception signals are only direct wave signals. In this case, the code phase error ERR is zero, and the vector angle θ is a constant value (theoretically zero). This is because, as shown in FIG. 11, the correlation values P of the direct wave signal are distributed along a substantially linear trace on the IQ coordinate plane. Theoretically, the early correlation value is equal to the late correlation value in the direct wave signal, such that the vector angle θ is zero. Actually, however, a correlation arithmetic operation is carried out while shifting phase by a predetermined phase width. Thus, the vector angle becomes a constant value determined in accordance with hardware performance.

Meanwhile, under the "presence" condition of the multipath effect, the reception signals become multipath signals, and the code phase error ERR and the vector angle θ change with the elapse of time. The changes in the vector angle θ can be approximated by sin waves, and the amplitude is determined in accordance with the relationship of signal intensity between the direct wave signal and the indirect wave signal and the difference between the carrier frequencies. Under the "presence" condition of the multipath effect, the following relationship is established between the vector angle θ and the code phase error ERR. That is, the vector angle θ becomes closer to the "absence" condition of the multipath effect (a constant value close to zero) as the code phase error ERR becomes larger. To the contrary, the vector angle θ becomes larger as the code phase error ERR becomes smaller.

It is determined whether the reception signal is a multipath signal or not on the basis of the PE value and the relationship between the vector angle θ and the code phase error ERR. When the code phase error ERR is sufficiently large, it is determined to be a multipath signal.

Figure 17:
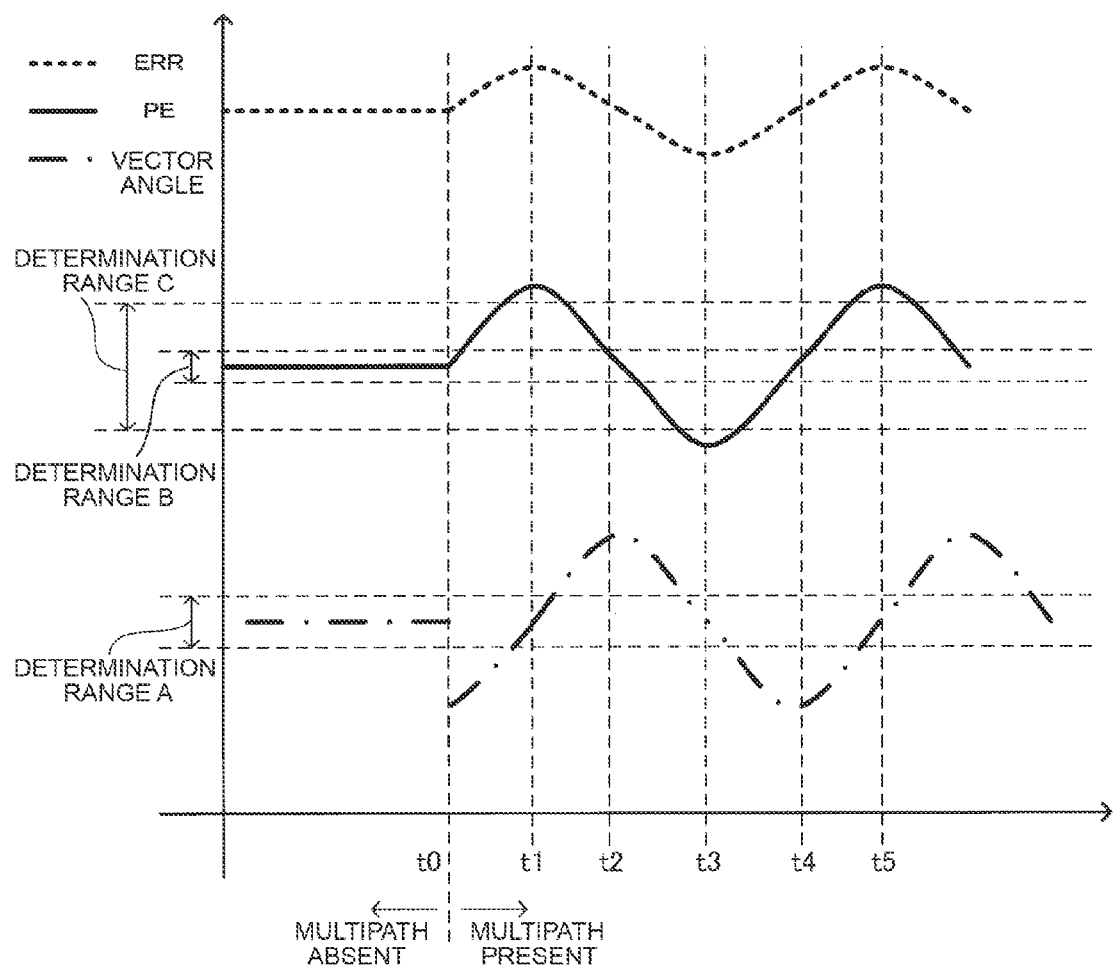
FIG. 17 is an explanatory view illustrating determination on whether a reception signal is a multipath signal.

Specifically, as shown in FIG. 17, determination ranges are determined for the PE value and the vector angle θ. FIG. 17 is a diagram showing temporal changes of the code phase error ERR, the PE value, and the vector angle θ when the multipath effect changes from "absence" to "presence". In FIG. 17 having the horizontal axis as a common time axis, the broken line indicates temporal change of the code phase error ERR, the solid line indicates temporal change of the PE value, and the one-dot-chain line indicates temporal change of the vector angle θ.

As shown in FIG. 17, determination ranges B and C are determined for the PE value. The determination ranges B and C have a common center value, and the center value is equal to the PE value when the reception signals are only direct wave signals (that is, a predetermined value according to C/A codes included in the direct wave signal). The width of the determination range C is so determined as to be larger than the determination range B.

The PE value of the direct wave signal varies depending on the C/A codes of the GPS satellite signal included in the direct wave signal. For this reason, the center values of the determination ranges B and C vary depending on the GPS satellite which is a capture target. A determination range A is determined for the vector angle θ. The center value of the determination range A is equal to the value of a vector angle θ when the reception signal is a direct wave signal.

It is determined that that the reception signal is a multipath signal when at least either "Condition A: the PE value is outside the determination range B and the vector angle θ is outside the determination range A" or "Condition B: the PE value is outside the determination range C" is satisfied. It is thus determined that the reception signal is not a multipath signal when neither of these conditions is satisfied. The reason for such determination is as follows.

Under the "absence" condition of the multipath effect, the PE value becomes a constant value according to the capture-target satellite, and the vector angle θ becomes a constant value (theoretically zero). That is, neither "condition A" nor "Condition B" is satisfied, and it is determined to be not a multipath signal. Meanwhile, under the "presence" condition of the multipath effect, the PE value changes approximately in the same manner as the change of the code phase error ERR. Further, the absolute value of the vector angle θ decreases as the absolute value of the code phase error ERR increases, and increases as the absolute value of the code phase error ERR decreases.

That is, depending on the relationship between the code phase error ERR and the vector angle θ, there is a case where "Condition A" is not satisfied even when the reception signal is a multipath signal. For example, referring to FIG. 17, "Condition A" is not satisfied but the absolute value of the code phase error ERR is large during the respective periods around the time t1, t3, and t5. For this reason, when the PE value is large to some extent, it is determined to be a multipath signal under "Condition B" regardless of the value of the vector angle θ.

(B) Determination of Reliability of Multipath Signal

Next, the principle of reliability determination of the multipath signal will be described. Reliability of the multipath signal is used as an index value which represents the allowable range of the multipath signal for use in position calculation. That is, as reliability of the multipath signal increases, the allowable range of the multipath signal for use in position calculation becomes larger. In this embodiment, as the width of change of the code phase error ERR (the amplitude of the code phase error) is smaller, the code phase is likely to be closer to the true value of the code phase due to error correction, it is determined that reliability of the multipath signal is high. Reliability of the multipath signal is determined by using an index value called "PL value".

Figure 18:
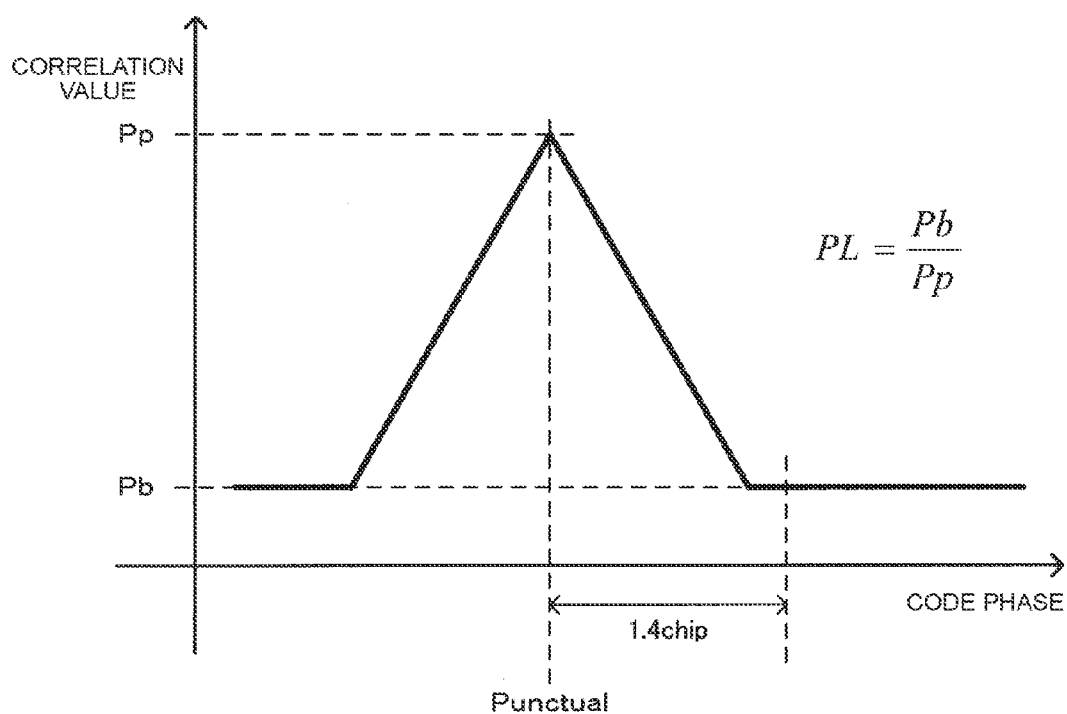
FIG. 18 is an explanatory view illustrating a calculation method of a PL value.

FIG. 18 is a diagram illustrating a calculation method of a PL value, and showing an example of a correlation result of a reception signal. Referring to FIG. 18, the PL value is calculated by Equation (2) based on the punctual correlation value Pp and a correlation value Pb at a phase delayed from the punctual phase by M chip.

$$PL=Pb/Pp \quad (2)$$

Here, M is in the range of $1 \leq M < 2$, and as shown in FIG. 18, M may be, for example, 1.4. That is, the PL value represents the ratio of the correlation value Pb and the punctual correlation value Pp.

The inventors have found experimentally that the effect of the indirect wave signal appears significantly at a phase delayed from the punctual phase by the amount equal to or larger than 1 chip and smaller than 2 chips, as compared with a phase delayed from the punctual phase by the amount smaller than 1 chip or a phase delayed from the punctual phase by the amount equal to or larger than 2 chips, and the absolute value of the correlation value tends to become larger. For this reason, in this embodiment, the PL value is calculated by using the correlation value at a phase delayed by 1 chip or larger and smaller than 2 chips ($1 \leq M < 2$).

Figure 19:
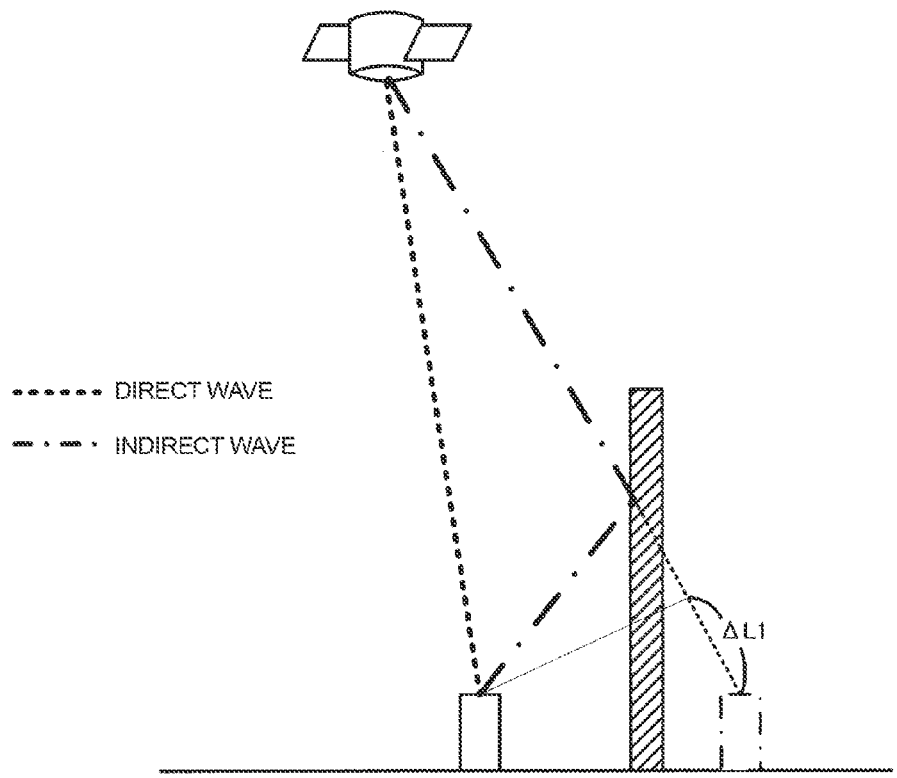
FIG. 19 is an explanatory view illustrating a PL value.

FIGS. 19 to 22 are diagrams illustrating the meaning expressed by the PL value. FIG. 19 shows a case where the GPS satellite signal transmitted from the GPS satellite is reflected by buildings and reaches the GPS receiver, and thus the reception signal received by the GPS receiver becomes a multipath signal. In this case, the drawing and description will be provided focusing on a case where a direct wave signal and an indirect wave signal strengthen each other. In FIG. 19, the propagation distance difference between the direct wave signal and the indirect wave signal is "ΔL1".

Figure 20:
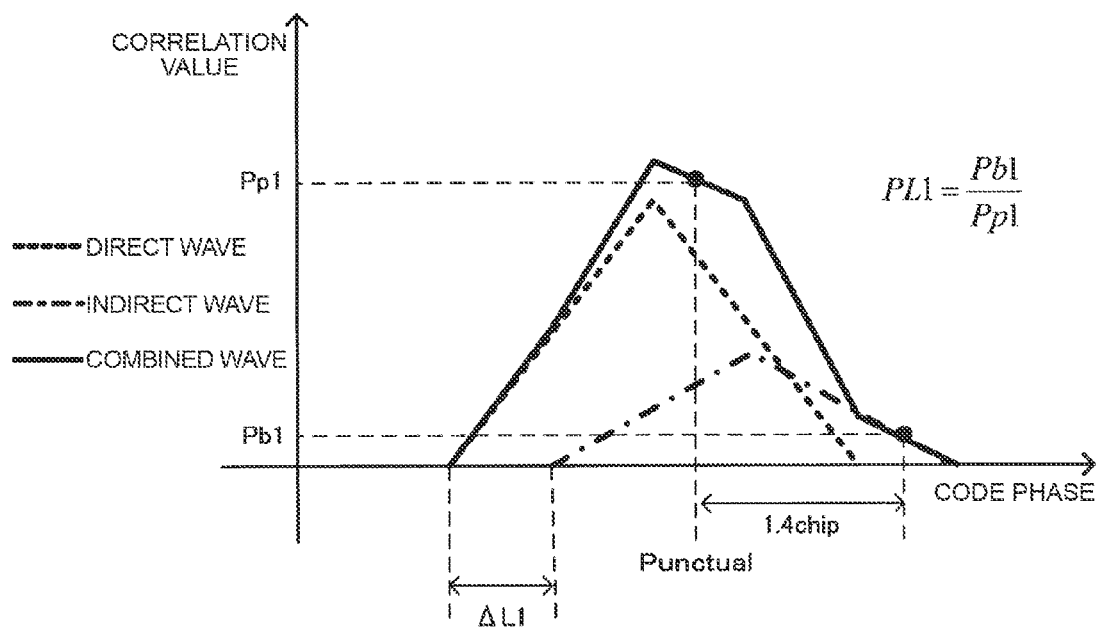
FIG. 20 is an explanatory view illustrating a PL value.

FIG. 20 is a diagram showing a correlation result of the multipath signal of FIG. 19. FIG. 20 is a graph of the correlation values of the direct wave signal, the indirect wave signal, and the combined wave signal of the direct wave signal and the indirect wave signal. The value, which is obtained by converting the phase shift between the direct wave signal and the indirect wave signal to a distance, corresponds to the propagation distance difference "ΔL1" of FIG. 19. In FIG. 20, when the PL value is calculated by using a punctual correlation value Pp1 and a correlation value Pb1 delayed from the punctual phase by 1.4 chip, the PL value becomes PL1=Pb1/Pp1.

Figure 21:
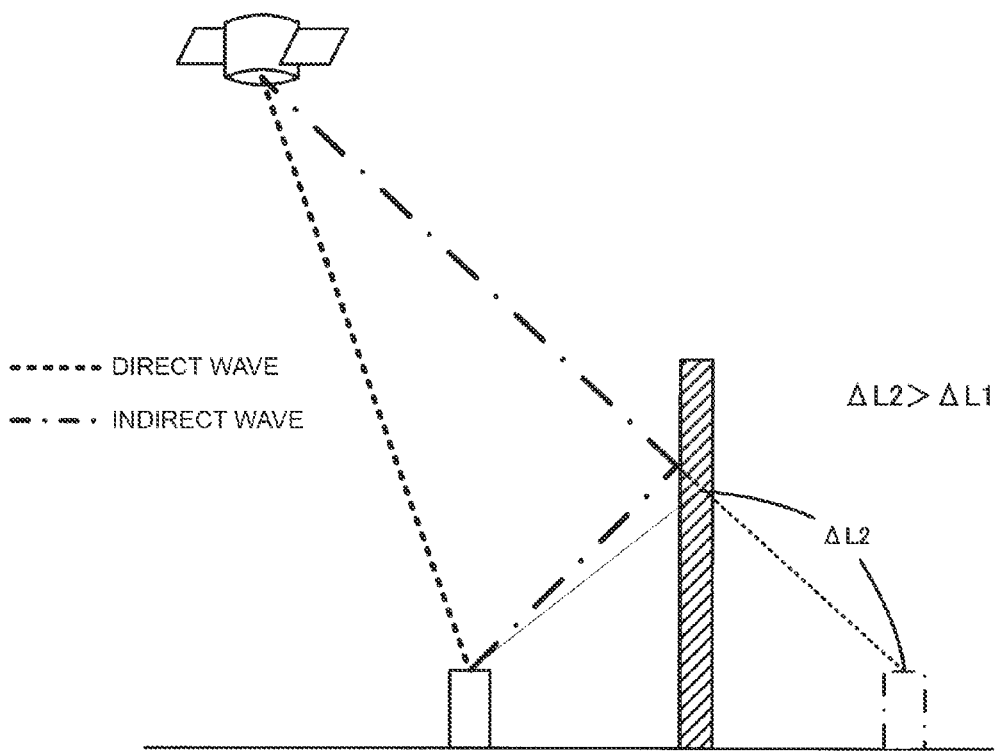
FIG. 21 is an explanatory view illustrating a PL value.

Similarly to FIG. 19, FIG. 21 shows a case where the GPS satellite signal transmitted from the GPS satellite and is reflected by buildings and reaches the GPS receiver, and thus the reception signal received by the GPS receiver becomes a multipath signal. In this case, description will be provided focusing on a case where the direct wave signal and the indirect wave signal strengthen each other. Referring to FIG. 21, the time (propagation time) until the GPS satellite signal transmitted from the GPS satellite is reflected by buildings and reaches the GPS receiver is extended, as compared with the example shown in FIG. 19. Thus, the propagation distance difference "ΔL2" between the direct wave signal and indirect wave signal is extended compared to the propagation distance difference "ΔL1" of FIG. 19 (ΔL2>ΔL1).

Figure 22:
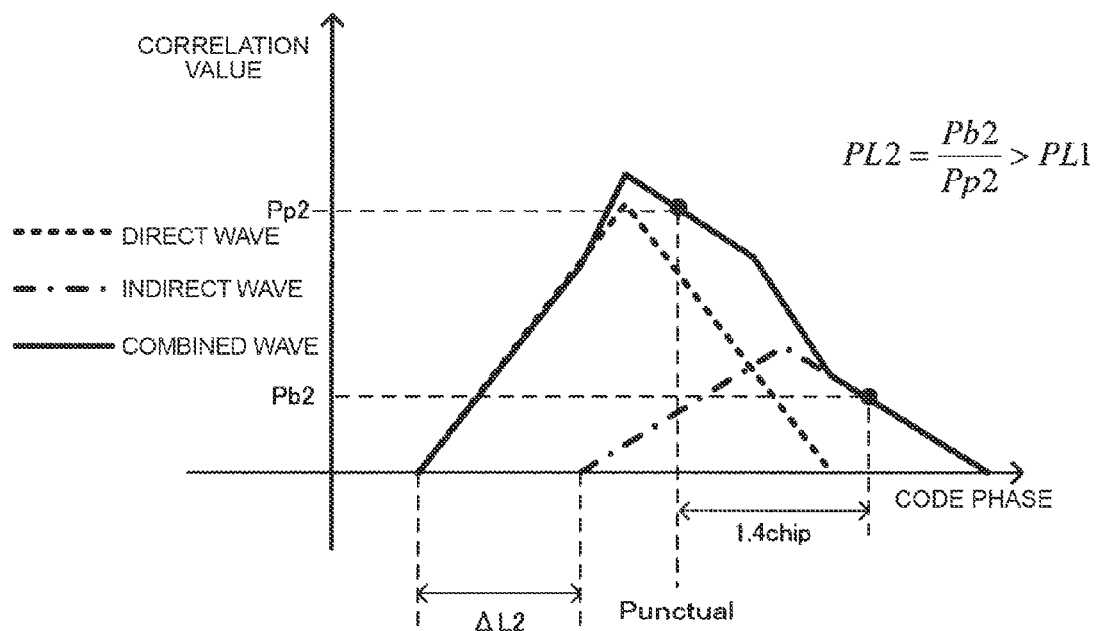
FIG. 22 is an explanatory view illustrating a PL value.

FIG. 22 is a diagram showing a correlation result of the multipath signal of FIG. 21. FIG. 22 is a graph of the correlation value of the direct wave signal, the indirect wave signal, and the combined wave signal of the direct wave signal and the indirect wave signal. The value, which is obtained by converting the phase shift between the direct wave signal and the indirect wave signal to a distance, corresponds to the propagation distance difference ΔL2" of FIG. 21. In FIG. 22, when the PL value is calculated by using a punctual correlation value Pp2 and a correlation value Pb2 at a phase delayed from the punctual phase by 1.4 chip, the PL value becomes PL2=Pb2/Pp2.

As described above, the GPS satellite signal is reflected by buildings and the propagation distance to the GPS receiver is extended. Thus, the peak phase of the indirect wave signal is delayed from the peak phase of the direct wave signal. Further, when the relationship ΔL2>ΔL1 is established, the amount of delay of the peak phase of the indirect wave signal shown in FIG. 22 is larger than the amount of delay of the peak phase of the indirect wave signal shown in FIG. 20. For this reason, in FIG. 22, the effect of the indirect wave signal at a phase shifted away from the punctual phase by M (=1.4) chip becomes larger compared to the case of FIG. 20, and the correlation value Pb2 becomes larger than the correlation value Pb1.

The relationship Pb2>Pb1 is established, such that the relationship PL2>PL1 is established by the definition expression of the PL value of Equation (2). Thus, if the condition ΔL2>ΔL1 is satisfied, the relationship PL2>PL1 is established, and the PL value increases as the propagation distance difference ΔL between the direct wave signal and the indirect wave signal is larger. That is, it can be considered that position correlation is provided between the propagation distance difference ΔL and the PL value.

Figure 23:
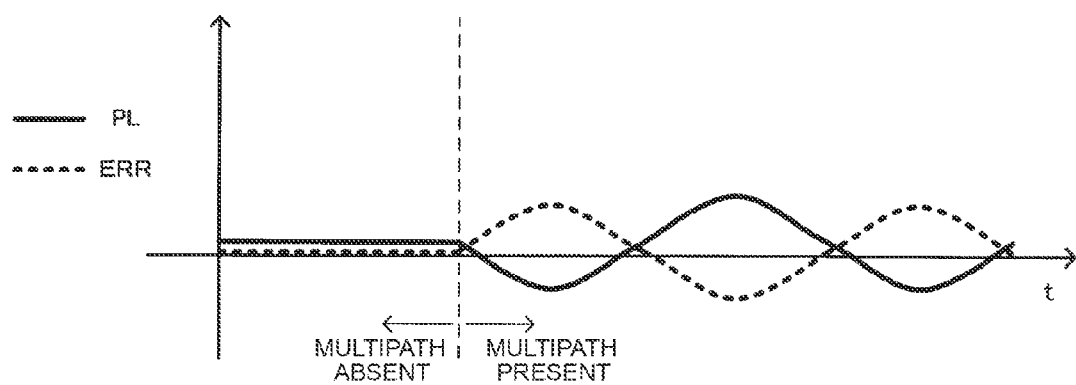
FIG. 23 is a diagram showing the relationship between a PL value and a code phase error.

The following relationship is established between the PL value and the code phase error ERR. FIG. 23 is a diagram showing the relationship between the PL value of the reception signal and the code phase error ERR when a simulation is carried out while changing the multipath effect from "absence" to "presence". In FIG. 23 having the horizontal axis as a common time axis, the solid line indicates temporal change of the PL value, and the broken line indicates temporal change of the code phase error ERR.

Referring to FIG. 23, under the "absence" condition of the multipath effect, the reception signals received by the GPS receiver are only direct wave signals. In this case, the code phase error ERR is substantially zero, and the PL value is also substantially zero. This is because, when the reception signals are only direct wave signals, as shown in FIG. 18, the correlation value approximately becomes zero at a phase shifted away from the punctual phase by 1 chip or larger, and the relationship Pb≅0 is established in the definition expression of Equation (2). The PL value under the "absence" condition of the multipath effect, that is, when there are no indirect wave signals, is hereinafter referred to as "PL offset value".

The inclination of the triangle of the correlation value varies depending on PRN codes of the GPS satellite signal, such that the PL offset value varies between the GPS satellites. Further, the height of the triangle of the correlation value varies depending on the signal intensity of the GPS satellite signal, such that the PL offset value also changes in accordance with the signal intensity of the GPS satellite signal. That is, the PL offset value depends on the number of the GPS satellite and the signal intensity of the GPS satellite signal.

Meanwhile, under the "presence" condition of the multipath effect, the reception signal becomes a multipath signal where an indirect wave signal is superimposed on a direct wave signal. In this case, the code phase error ERR and the PL value change with the elapse of time. The change of the PL value can be approximated by sin waves, and the amplitude is determined by the difference in the signal intensity or the traveling distance between the direct wave signal and the indirect wave signal.

It can be seen that from FIG. 23 that the PL value and the code phase error ERR substantially change inversely with the elapse of time. That is, the PL value decreases as the code phase error ERR increases, and the PL value increases as the code phase error ERR decreases. As described above, when the direct wave signal and the indirect wave signal strengthen each other, the code phase error ERR has a positive value, and when the direct wave signal and the indirect wave signal weaken each other, the code phase error ERR has a negative value. Thus, when the direct wave signal and the indirect wave signal strengthen each other, the PL value changes in a decreasing direction, and when the direct wave signal and the indirect wave signal weaken each other, the PL value changes in an increasing direction.

As described above, the direction of increase/decrease of the PL value changes depending on the type of interference (strengthening/weakening) of the direct wave signal and the indirect wave signal. Further, the signal intensity of the reception signal constantly changes, and the amount of increase/decrease of the PL value also changes depending on the relationship of signal intensity between the direct wave signal and the indirect wave signal. Thus, even when the PL value is observed, it is impossible to distinguish the change due to the difference in interference of the direct wave signal and the indirect wave signal or the change in the signal intensity. Accordingly, the inventors have defined the value obtained by subtracting the PL offset value from the PL value as "ΔPL value" and have experimented to examine temporal changes of the ΔPL value.

Figure 24:
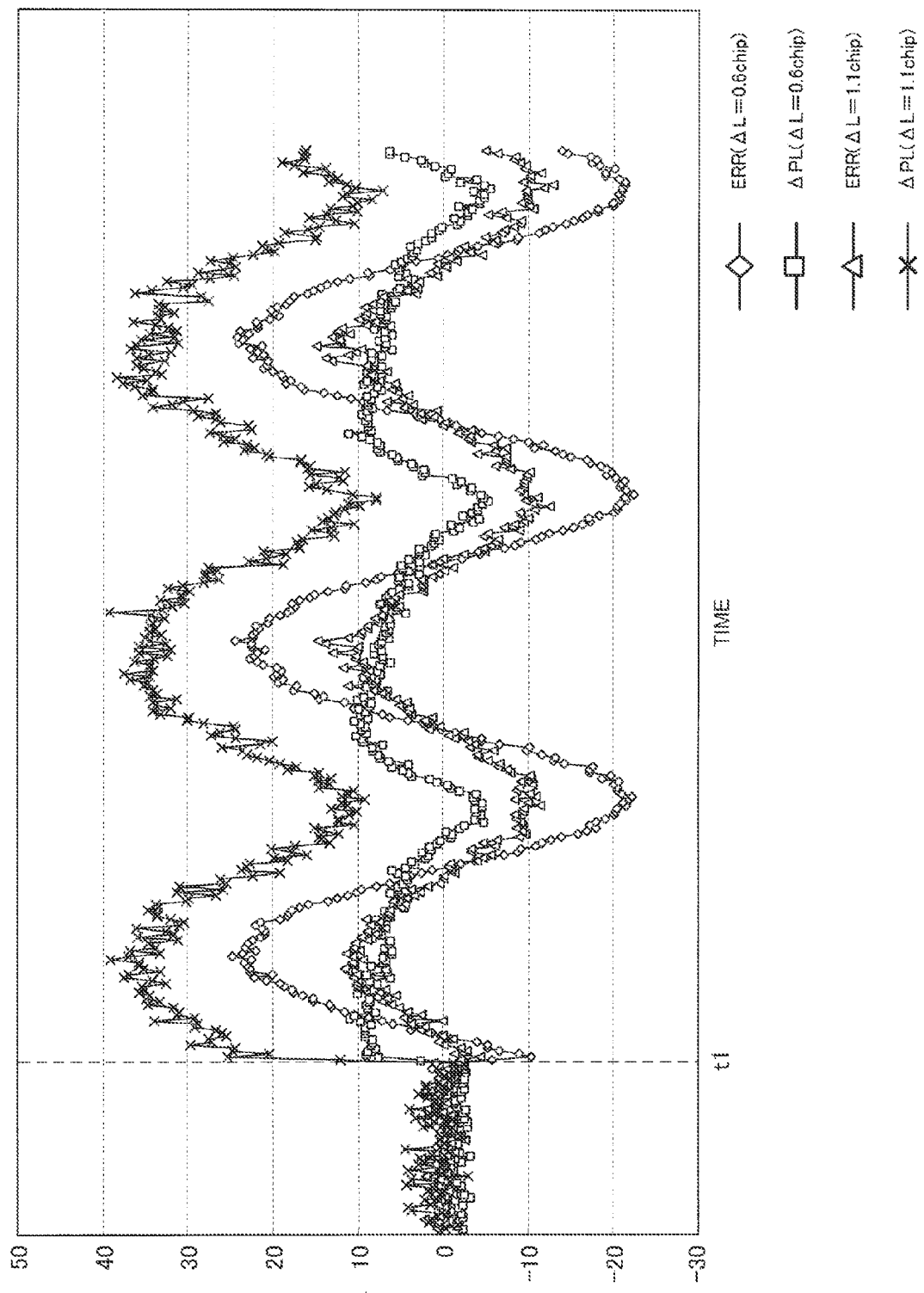
FIG. 24 is a diagram showing the relationship between a ΔPL value and a code phase error.

FIG. 24 is a diagram showing the relationship between the code phase error ERR and the ΔPL value. FIG. 24 shows the result of a simulation in a case where the reception signals are only direct wave signals until the time t1, and indirect wave signals are superimposed on direct wave signal at the time t1. Further, the relationship between the ΔPL value and the code phase error ERR has been examined while changing the propagation distance difference ΔL between the direct wave signal and the indirect wave signal. The code phase error ERR and the ΔPL value when the propagation distance difference ΔL is 0.6 chip (=about 180 m) are respectively indicated by a diamond and a rectangle, and the code phase error ERR and the ΔPL value when the propagation distance difference ΔL is 1.1 chip (=about 330 m) are respectively indicated by a triangle and an x mark.

Referring to FIG. 24, it can be seen that, in all of the cases where the propagation distance difference ΔL is 0.6 chip and 1.1 chip, the waveform of the code phase error ERR fluctuates with a value around zero as the center. Further, in comparison of the width (amplitude) of change in the code phase error ERR, it can be seen that the width of the change becomes smaller when the propagation distance difference ΔL is 1.1 chip. From this, the amplitude of the code phase error ERR tends to become smaller as the propagation distance difference ΔL becomes larger. Actually, the inventors have confirmed experimentally that, when the propagation distance difference ΔL is in the range of 0.6 to 1.5 chip, the amplitude of the code phase error ERR becomes smaller as the propagation distance difference ΔL becomes larger.

Accordingly, the amplitude of the code phase error ERR is smaller as the propagation distance difference ΔL becomes larger. Thus, if the code phase error ERR is corrected, the code phase becomes closer to the true code phase. If the code phase easily becomes close to the true code phase, even a multipath signal can be used for position calculation. In this embodiment, a multipath signal at a code phase which is likely to become close to the true code phase by correcting the code phase error ERR is called "multipath signal having high reliability". Thus, it can be considered that reliability of multipath signal is higher as the propagation distance difference ΔL becomes larger.

Focusing on the ΔPL value, in all of the cases where the propagation distance difference ΔL is 0.6 chip and 1.1 chip, the waveform of the ΔPL value fluctuates vertically. A characteristic resides in that, in the case of ΔL=1.1 chip, the distribution of the ΔPL value concentrates on the upper part of the graph, and becomes a value as if a bias is applied. That is, the ΔPL value is generally large when the propagation distance difference ΔL is 1.1 chip, as compared with a case where the propagation distance difference ΔL is 0.6 chip. For this reason, it can be seen that the ΔPL value generally is larger as the propagation distance difference ΔL becomes larger.

The increase/decrease in the ΔPL value shown in FIG. 24 and the increase/decrease in the PL value shown in FIG. 23 are reversed. This is caused by the characteristics of a filter provided in the receiving circuit of the GPS receiver, but this phenomenon has no significant meaning. In the front-state portion in the receiving circuit of the GPS receiver, the reception signal may pass through a filter, such as a low-pass filter, to attenuate a signal in a high frequency band. At this time, if the cutoff frequency of the low-pass filter is set to be high, when a correlation arithmetic operation is carried out the reception signal after passing through the filter, the effect of the direct wave signal may appear at a phase delayed from the punctual phase by M chip. Then, depending on the magnitude relationship between the PL value calculated in this case and the PL offset value, the increase/decrease in the ΔPL value and the increase/decrease in the PL value may be reversed. Of course, the increase/decrease in the ΔPL value and the increase/decrease in the PL value may be identical according to the filter characteristics, but the ΔPL value does not generally change to become larger as the propagation distance difference ΔL becomes larger.

The reliability of the multipath signal is determined as follows on the basis of the experiment result of FIG. 24. That is, as shown in FIG. 25, threshold value determination is carried out for the ΔPL value. When the ΔPL value is equal to or larger than a predetermined threshold value, it is estimated that the propagation distance difference ΔL is large and the code phase error ERR is small. Thus, the reliability of the multipath signal is determined to be "high". This means that the delay distance of the indirect wave signal with respect to the direct wave signal is long.

Meanwhile, when the ΔPL value does not reach the threshold value, it is estimated that the propagation distance difference ΔL is small and the code phase error ERR is large. Thus, the reliability of the multipath signal is determined to be "low". This means that the delay distance of the indirect wave signal with respect to the direct wave signal is short.

The threshold value of the ΔPL value may be selected or set as an appropriate value through a simulation. For example, in the case of the result of the simulation of FIG. 24, if the threshold value of the ΔPL value is set to "10" and then threshold value determination is carried out, the waveform of the ΔPL value in the case of ΔL=0.6 chip and the waveform of the ΔPL value in the case of ΔL=1.1 chip can be separated from each other, and the reliability of the multipath signal can be determined.

(C) Correction of Code Phase

Next, the principle of correction of the core phase when it is determined that the reception signal is a multipath signal will be described. The case has been described in which, when the direct wave signal and the indirect wave signal weaken each other, the code phase error ERR has a positive value, and when the direct wave signal and the indirect wave signal weaken each other, the code phase error ERR has a negative value. This means that the sign of the code phase error ERR changes depending on the type of interference of the direct wave signal and the indirect wave signal.

In FIG. 24, the case has been described in which, when the propagation distance difference ΔL is in the range of 0.6 to 1.5 chip, the amplitude of the code phase error ERR tends to become smaller as the propagation distance difference ΔL between the direct wave signal and the indirect wave signal becomes larger. Further, in the above-described range, the ΔPL value tends to become larger as the propagation distance difference ΔL becomes larger. That is, positive correlation is provided between the propagation distance difference ΔL and the ΔPL value. Thus, the amplitude of the code phase error ERR tends to become smaller as the ΔPL value becomes larger. As described with reference to FIG. 25, the reliability of the multipath signal becomes higher as the ΔPL value becomes larger. Thus, the amplitude of the code phase error ERR tends to become smaller as the reliability of the multipath signal becomes higher. This means that the amplitude of the code phase error ERR changes depending on the reliability of the multipath signal. In other words, the amplitude of the code phase error ERR changes depending on the delay distance of the indirect wave signal with respect to the direct wave signal.

The inventors have determined on the basis of this insight that it is appropriate to calculate the code phase error ERR while changing the calculation method in accordance with the two elements of (a) the reliability of the multipath signal and (b) whether the correlation value is in a strengthened state or is in a weakened state (the type of interference of the direct wave signal and the indirect wave signal).

As described above, (a) the reliability of the multipath signal can be determined on the basis of the magnitude of the ΔPL value. However, there is a difficulty in determining (b) whether the correlation value is in a strengthened state or is in a weakened state (the type of interference of the direct wave signal and the indirect wave signal). That is, an index value is required for determining whether the correlation value is in a strengthened state or is in a weakened state.

Accordingly, the inventors have focused on the PE value which is defined by the principle of (A) Detection of Multipath Signal. The PE value increases/decreases depending on the phase difference between the direct wave signal and the indirect wave signal, and also increases/decreases depending on the signal intensity of the reception signal. Accordingly, when only the PE value is observed, it is impossible to distinguish whether the increase/decrease is due to the difference of interference of the direct wave signal and the indirect wave signal or due to the change in the signal intensity of the reception signal. Thus, the value obtained by subtracting the PE offset value from the PE value has been defined as "ΔPE value", and an experiment has been carried out to examine temporal changes of the ΔPE value.

Figure 26:
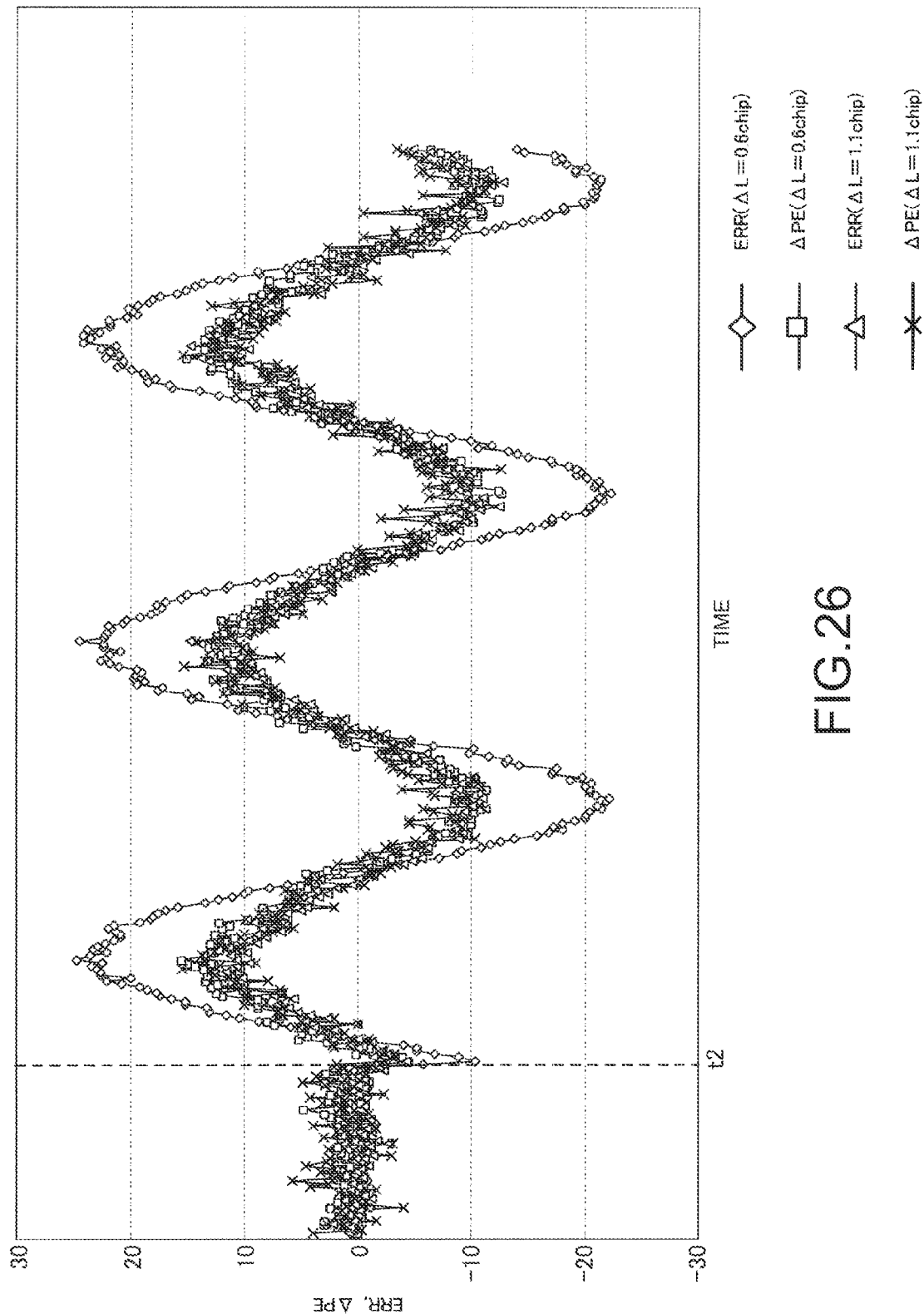
FIG. 26 is a diagram showing the relationship between a ΔPE value and a code phase error.

FIG. 26 is a diagram showing the relationship between the code phase error ERR and the ΔPE value. FIG. 26 shows the result of a simulation in which the reception signal is just a direct wave signal until the time t2, and an indirect wave signal is superimposed on a direct wave signal at the time t2. Further, the relationship between the ΔPE value and the code phase error ERR has been examined while changing the propagation distance difference ΔL between the direct wave signal and the indirect wave signal. The code phase error ERR and the ΔPE value when the propagation distance difference ΔL is 0.6 chip (=about 180 m) are respectively indicated by a diamond and a triangle, and the code phase error ERR and the ΔPE value when the propagation distance difference ΔL is 1.1 chip (=about 330 m) are respectively indicated by a triangle and an x mark.

Referring to FIG. 26, it can be seen that the ΔPE value and the code phase error ERR change with the elapse of time in the substantially same manner, without depending on the propagation distance difference ΔL. That is, the ΔPE value increases as the code phase error ERR increases, and the ΔPE value decreases as the code phase error ERR decreases. That is, when the direct wave signal and the indirect wave signal strengthen each other by interference, the ΔPE value changes in an increasing direction, and when the direct wave signal and the indirect wave signal weaken each other by interference, the ΔPE value changes in a decreasing direction.

Focusing on the waveform of the ΔPE value, it can be seen that the ΔPE value fluctuates with a value around zero as the center, and when propagation distance difference ΔL is 0.6 chip and when propagation distance difference ΔL is 1.1 chip, the waveforms substantially overlap each other. Thus, it can be considered that the ΔPE value substantially has the same characteristic without depending on the propagation distance difference ΔL.

According to the experiment result, when the direct wave signal and the indirect wave signal strengthen each other by interference (in the case of incremental interference), the ΔPE value has a positive value. When the direct wave signal and the indirect wave signal weaken each other by interference (in the case of decremental interference), the ΔPE value has a negative value. Thus, the state where the correlation value is strengthened/weakened (the type of interference of the direct wave signal and the indirect wave signal) can be determined on the basis of the sign of the ΔPE value.

From the experiment result, in this embodiment, an expression for correcting the code phase error ERR (hereinafter, referred to as "error model expression") is variably selected on the basis of the sign of the ΔPE value and the reliability of the multipath signal, and then the code phase is corrected. This corresponds to correction of the code phase while varying the error model expression in accordance with the type of interference of the direct wave signal and the indirect wave signal (=the difference in the sign of the ΔPE value) and the delay distance of the indirect wave signal with respect to the direct wave signal (=the difference in the reliability of the multipath signal).

Specifically, error model expressions are determined in advance to correspond to four patterns of (1) the sign of the ΔPE value is "positive" and the reliability of the multipath signal is "high", (2) the sign of the ΔPE value is "positive" and the reliability of the multipath signal is "low", (3) the sign of the ΔPE value is "negative" and the reliability of the multipath signal is "high", and (4) the sign of the ΔPE value is "negative" and the reliability of the multipath signal is "low". For example, four error model expressions of Equations (3) to (6) are determined.

$$ERR = a_1 \cdot \Delta PE + b_1 (\Delta PE \geq 0 \text{ and } \Delta PL \geq \text{threshold value}) \quad (3)$$

$$ERR = a_2 \cdot \Delta PE + b_2 (\Delta PE \geq 0 \text{ and } \Delta PL < \text{threshold value}) \quad (4)$$

$$ERR = a_3 \cdot \Delta PE + b_3 (\Delta PE < 0 \text{ and } \Delta PL \geq \text{threshold value}) \quad (5)$$

$$ERR = a_4 \cdot \Delta PE + b_4 (\Delta PE < 0 \text{ and } \Delta PL < \text{threshold value}) \quad (6)$$

Here, "a1" to "a4" and "b1" to "b4" are coefficients according to the respective error model expressions. These error model expressions can be obtained by fitting of functions using a least-squares method for sampling data of the ΔPE value and the ERR value, for example.

After the above-described error model expressions are defined, the error model expressions are alternatively selected on the basis of the ΔPE value and the ΔPL value, and the code phase error ERR is calculated. That is, the selected error model expression is substituted into the ΔPE value, such that the code phase error ERR is calculated. Then, the calculated code phase error ERR is added to the code phase acquired by the correlation calculation to correct the code phase error ERR.

1. First Example 1-1. Functional Configuration

Figure 27:
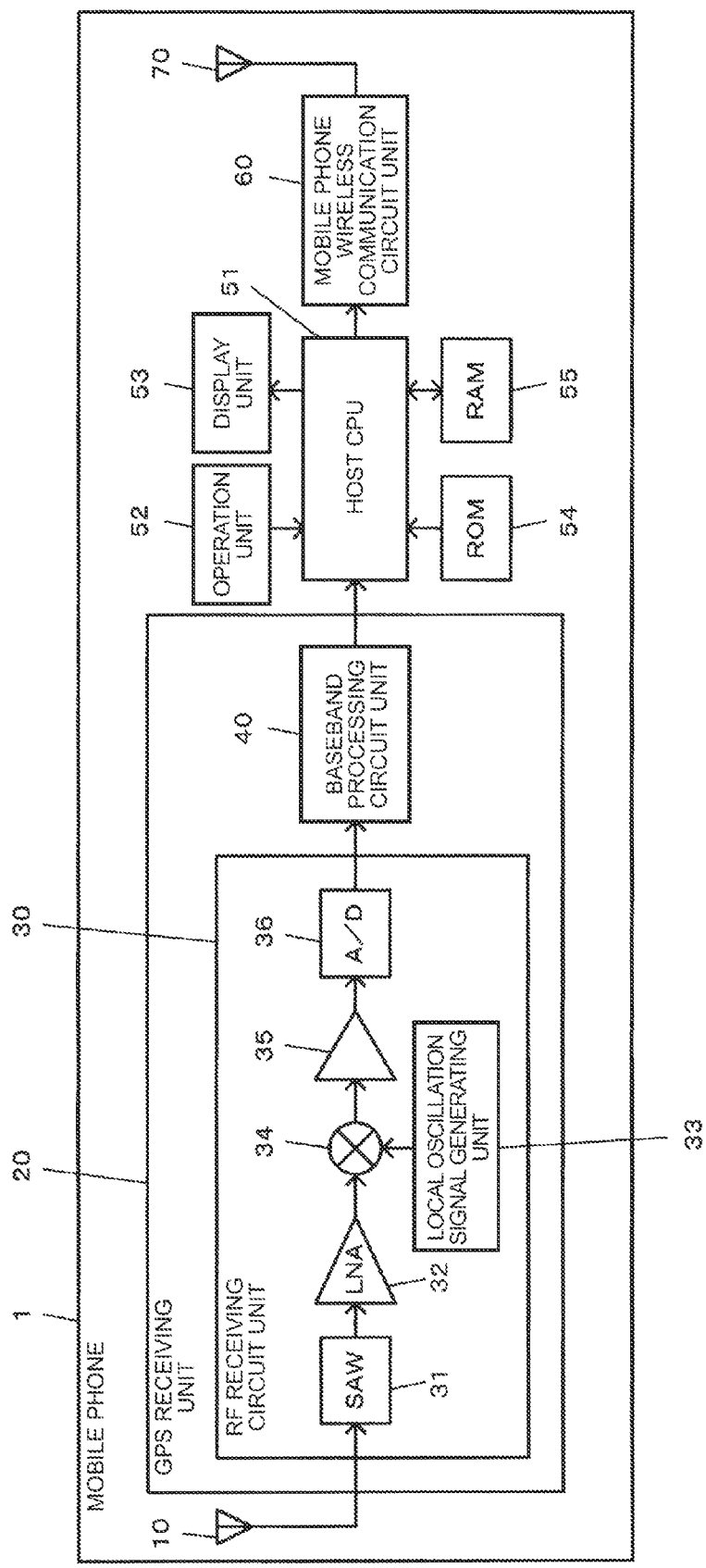
FIG. 27 is a block diagram showing the functional configuration of a mobile phone.

FIG. 27 is a block diagram showing the internal configuration of a mobile phone 1. The mobile phone includes a GPS antenna 10, a GPS receiving unit 20, a host CPU (Central Processing Unit) 51, an operation unit 52, a display unit 53, a ROM (Read Only Memory) 54, a RAM (Random Access Memory) 55, a mobile phone wireless communication circuit unit 60, and a mobile phone antenna 70.

The GPS antenna 10 is an antenna which receives an RF (Radio Frequency) signal including a GPS satellite signal transmitted from a GPS satellite. The GPS satellite signal is a signal spectrum-modulated by C/A codes as PRN codes and superimposed on carrier waves in an L1 band having a carrier wave frequency of 1.57542 [GHz].

The GPS receiving unit 20 captures and extracts the GPS satellite signal from the RF signal received by the GPS antenna 10, and carries out a positioning arithmetic operation based on a navigation message or the like extracted from the GPS satellite signal to calculate the current position. The GPS receiving unit 20 has an RF receiving circuit unit 30 and a baseband processing circuit unit 40. In this embodiment, the GPS receiving unit 20 is a functional block corresponding to a multipath signal detection device and a multipath signal reliability determination device.

The RF receiving circuit unit 30 has a SAW (Surface Acoustic Wave) filter 31, an LNA (Low Noise Amplifier) 32, a local oscillation signal generating unit 33, a multiplying unit 34, an amplifying unit 35, and an A/D converting unit 36. The RF receiving circuit unit 30 receives signals by a so-called super-heterodyne system.

The SAW filter 31 is a band pass filter which transmits signals in a predetermined band included in the RF signal input from the GPS antenna 10, and blocks frequency components outside the band.

The LNA 32 is a low-noise amplifier which amplifies signals input from the SAW filter 31 and outputs the amplified signals.

The local oscillation signal generating unit 33 includes an oscillator, such as an LO (Local Oscillator), and generates a local oscillation signal.

The multiplying unit 34 includes a multiplier which combines a plurality of signals, and down-converts the RF signal input from the LNA 32 into an intermediate frequency signal (IF signal) by multiplying (combining) the RF signal by the local oscillation signal generated by the local oscillation signal generating unit 33. Though not shown, the multiplying unit 34 down-converts the reception signal into the IF signal by multiplying the RF signal by local oscillation signals whose phases are shifted by 90 degrees from each other, and separates the reception signal into the in-phase component (I signal) and the orthogonal component (Q signal).

The amplifying unit 35 amplifies the IF signal (I signal and Q signal) input from the multiplying unit 34 at a predetermined amplification rate. The A/D converting unit 36 converts the signal (analog signal) input from the amplifying unit 35 into a digital signal. Thus, the RF receiving circuit unit 30 outputs the I signal and Q signal of the IF signal.

The baseband processing circuit unit 40 captures and tracks the GPS satellite signal from the IF signal input from the RF receiving circuit unit 30, and carries out pseudo distance calculation or positioning calculation on the basis of the navigation message, time information, and the like extracted from decoded data.

Figure 28:
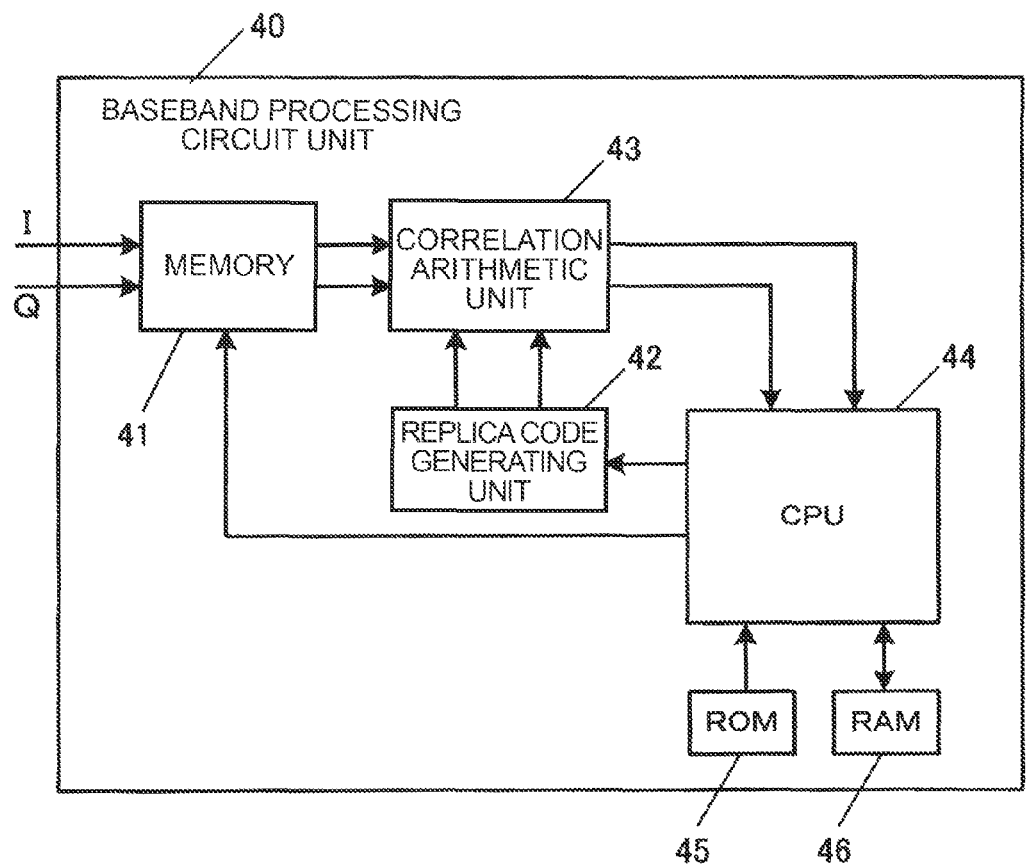
FIG. 28 is a block diagram showing the circuit configuration of a baseband processing circuit unit.

FIG. 28 is a diagram showing an example of the circuit configuration of the baseband processing circuit unit 40. The baseband processing circuit unit 40 includes a memory 41, a replica code generating unit 42, a correlation arithmetic unit 43, a CPU 44, a ROM 45, and a RAM 46.

The memory 41 samples the I signal and Q signal of the IF signal input from the RF receiving circuit unit 30 at a predetermined time interval, and stores the sampled signals.

The replica code generating unit 42 generates and outputs replica codes (replica signal) simulating PRN codes of the GPS satellite signal of the capture-target GPS satellite in accordance with a control signal from the CPU 44.

The correlation arithmetic unit 43 carries out a correlation arithmetic operation between sampling data of the I signal and Q signal of the IF signal stored in the memory 41 and the replica codes input from the replica code generating unit 42 while shifting the phase of the replica codes.

The CPU 44 is a processor which performs overall control of the respective units of the baseband processing circuit unit 40, and carries out various kinds of calculation including position calculation processing. The CPU 44 causes the replica code generating unit 42 to generate replica codes corresponding to C/A codes of the capture-target satellite. Then, the CPU 44 detects the C/A codes and the code phase included in the GPS satellite signal on the basis of the correlation arithmetic result (correlation value) by the correlation arithmetic unit 43 to capture and track the GPS satellite signal. Tracking of the GPS satellite signal is carried out by variable control of the phase being currently tracked (punctual phase) such that the late correlation value and the early correlation value described above are equal to each other.

The ROM 45 is a read-only nonvolatile storage device which stores a system program for allowing the CPU 44 to control the respective units of the baseband processing circuit unit 40 and the RF receiving circuit unit 30, and various programs and data for realizing various kinds of processing including position calculation processing.

The RAM 46 is a rewritable volatile storage device which is used as the work area of the CPU 44, and temporarily stores programs or data read from the ROM 45 and arithmetic results by the CPU 44 according to various programs.

The host CPU 51 is a processor which performs overall control of the respective units of the mobile phone 1 in accordance with various programs, such as the system program stored in the ROM 54. Specifically, the host CPU 51 primarily performs processing for realizing various functions including a call function as a telephone and a position display function for displaying a position display screen on the display unit 53 where the current position of the mobile phone 1 input from the baseband processing circuit unit 40 is plotted on a map.

The operation unit 52 is an input device which has operation keys and button switches, and outputs operation signals to the host CPU 51 in accordance with the operations by the user. Various instructions, such as start/end instruction of position calculation, are input by the operation of the operation unit 52.

The display unit 53 is a display device which is formed by an LCD (Liquid Crystal Display) or the like, and displays a display screen (for example, position display screen, time information, or the like) based on a display signal input from the host CPU 51.

The ROM 54 stores the system program for allowing the host CPU 51 to control the mobile phone 1, and various programs and data for realizing the position display function.

The RAM 55 is used as the work area of the host CPU 51, and temporarily stores programs and data read from the ROM 54, data input from the operation unit 52, and arithmetic results by the host CPU 51 according to various programs.

The mobile phone wireless communication circuit unit 60 is a communication circuit unit for a mobile phone which includes an RF conversion circuit, a baseband processing circuit, and the like, and transmits and receives wireless signals under the control of the host CPU 51.

The mobile phone antenna 70 is an antenna which transmits and receives wireless signals for a mobile phone to and from a wireless base station provided by a communication service provider of the mobile phone 1.

1-2. Data Configuration

Figure 29:
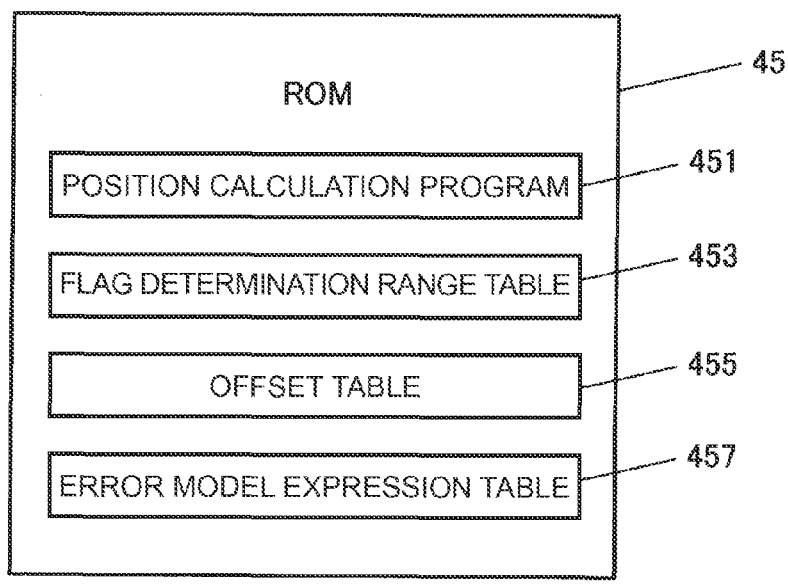
FIG. 29 is a diagram showing the data configuration of a ROM.

FIG. 29 is a diagram showing an example of data stored in the ROM 45 of the baseband processing circuit unit 40. The ROM 45 stores a position calculation program 451 read by the CPU 44 and executed as position calculation processing (see FIG. 35), a flag determination range table 453, an offset table 455, and an error model expression table 457.

In the position calculation processing, the CPU 44 acquires and calculates measurement for position calculation on the basis of the correlation results of the reception signals for the respective capture-target satellites. The measurement is information regarding the reception signal for use in position calculation by the CPU 44, and includes information regarding the reception frequency of the reception signal and the code phase.

Next, for each GPS satellite signal which is successfully captured, the CPU 44 determines whether or not the relevant GPS satellite signal is a multipath signal, and when it is determined to be a multipath signal, determines the reliability of the relevant multipath signal. Then, processing is carried out to correct the code phase included in the measurement on the basis of the reliability determination result, and predetermined position calculation is carried out by using the corrected code phase to calculate the position of the mobile phone 1. The position calculation processing will be described below in detail with reference to a flowchart.

Figures 30, 31:
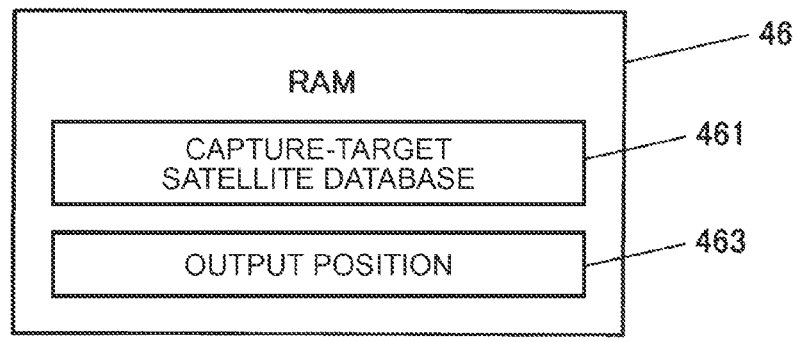
FIG. 30 is a diagram showing the data configuration of a RAM.
FIG. 31 is a diagram showing the data configuration of a flag determination range table.

FIG. 31 is a diagram showing an example of the data configuration of the flag determination range table 453. The flag determination range table 453 stores the center values of the determination ranges A to C and the widths from each center value as reference in the positive and negative directions in association with the GPS satellites. The flag determination range table 453 is used to determine whether or not the GPS satellite signal which is a determination target is a multipath signal or not in multipath detection processing.

Figure 32:
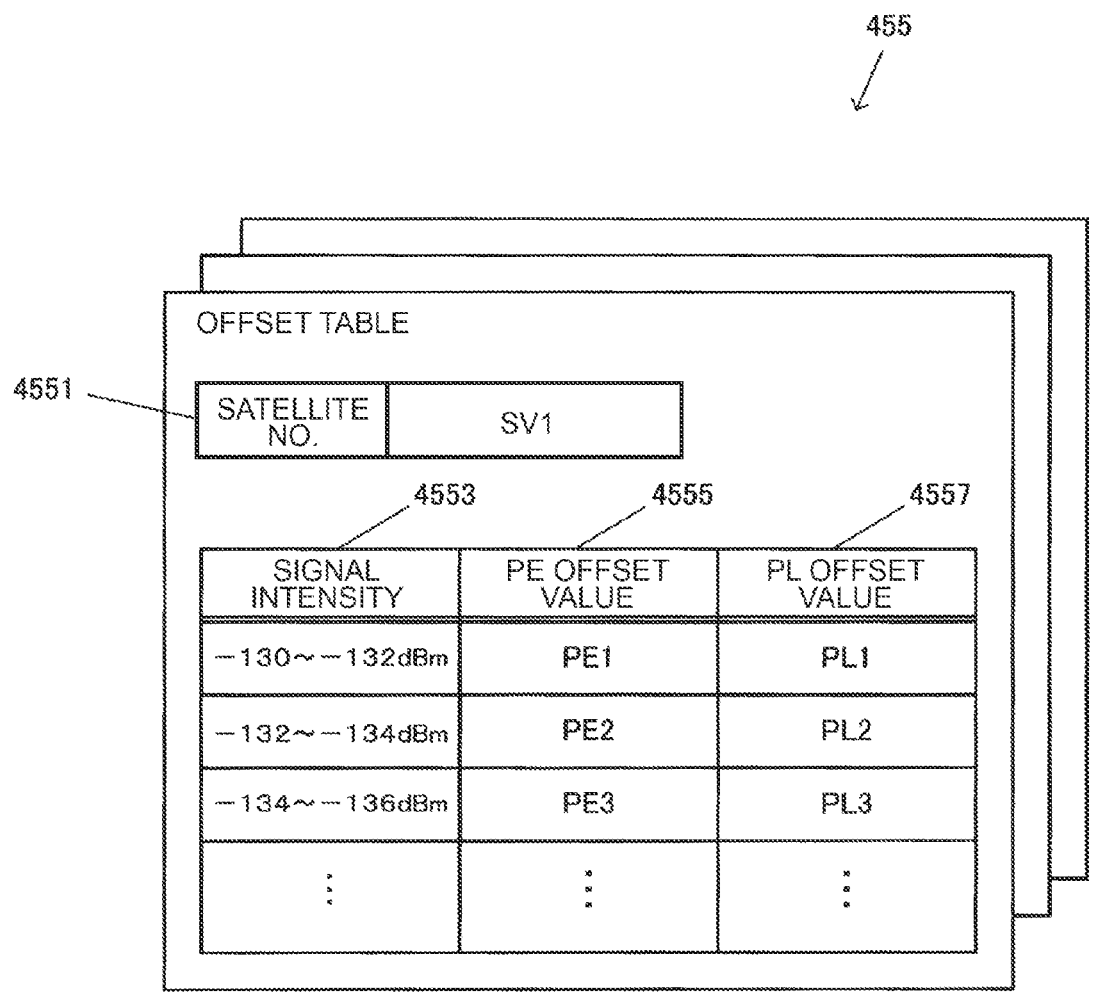
FIG. 32 is a diagram showing the data configuration of an offset table.

FIG. 32 is a diagram showing an example of the data configuration of the offset table 455. The offset table 455 stores the PE offset value 4555 and PL offset value 4557 in terms of the signal intensity 4553 of the reception signal in association with each GPS satellite 4551. The offset table 455 is used to calculate the ΔPE value and the ΔPL value.

FIG. 33 is a diagram showing an example of the data configuration of the error model expression table 457. The error model expression table 457 is a table in which error model expressions for used in correction of the code phase are determined. Four error model expressions are determined in accordance with the positive/negative sign of the ΔPE value and the reliability of the multipath signal.

FIG. 30 is a diagram showing an example of data stored in the RAM 46 of the baseband processing circuit unit 40. The RAM 46 stores a capture-target satellite database 461 and an output position 463.

Figure 34:
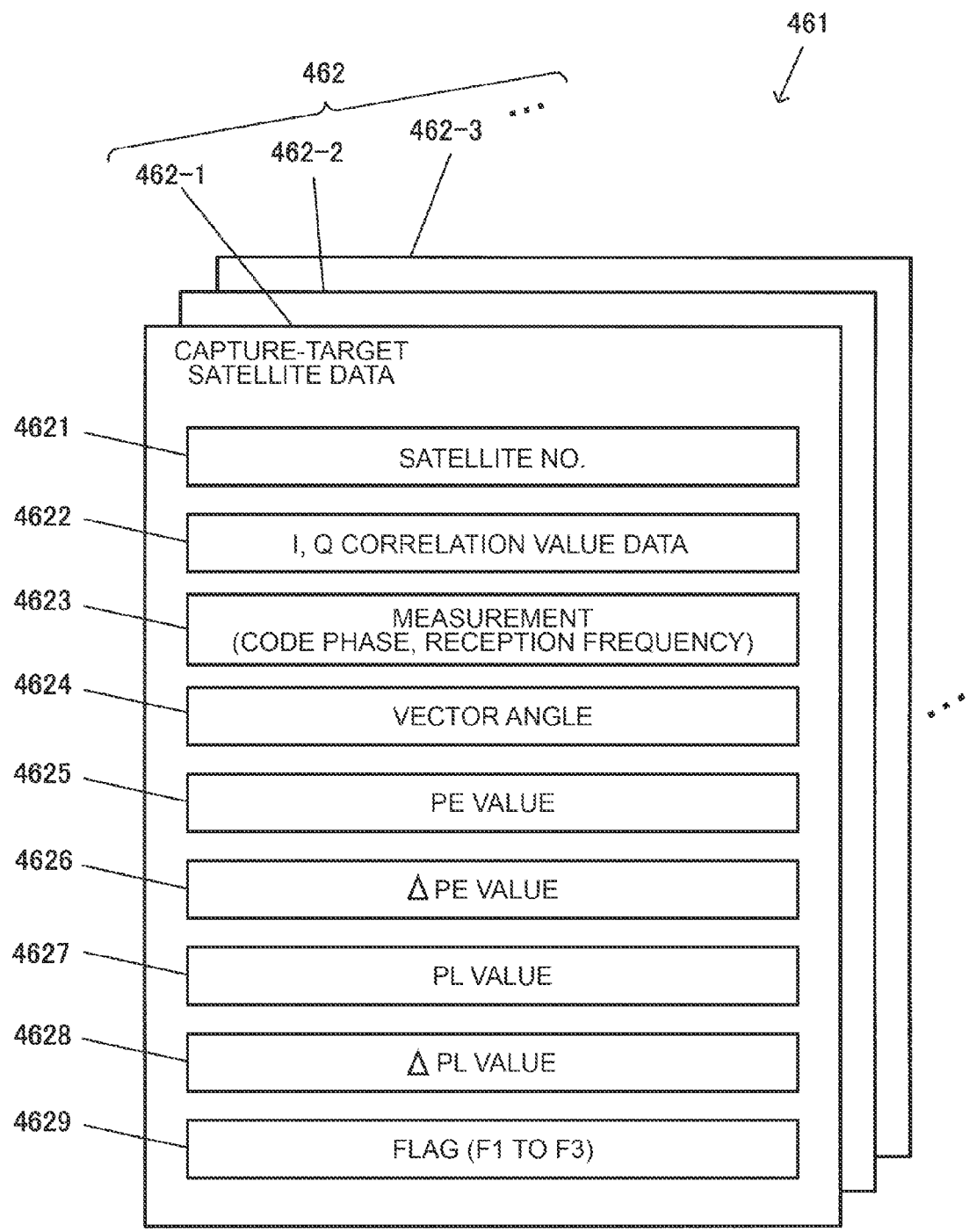
FIG. 34 is a diagram showing the data configuration of a capture-target satellite database.

FIG. 34 is a diagram showing an example of the data configuration of the capture-target satellite database 461. The capture-target satellite database 461 is a database in which capture-target satellite data 462(462-1, 462-2, 462-3, . . . ) which is data for the respective capture-target satellites are accumulated and stored.

Respective capture-target satellite data 462 stores the satellite number 4621, IQ correlation value data 4622 which is the result of a correlation arithmetic operation for the relevant capture-target satellite, measurement 4623 including the reception frequency and the code phase acquired and calculated for the relevant capture-target satellite, the vector angle 4624, the PE value 4625, the ΔPE value 4626, the PL value 4627, and the ΔPL value 4628 calculated for the relevant capture-target satellite, and the flag 4629 including F1 to F3.

The output position 463 is data regarding a position which is determined as a position finally output by the position calculation processing.

1-3. Flow of Processing

Figure 35:
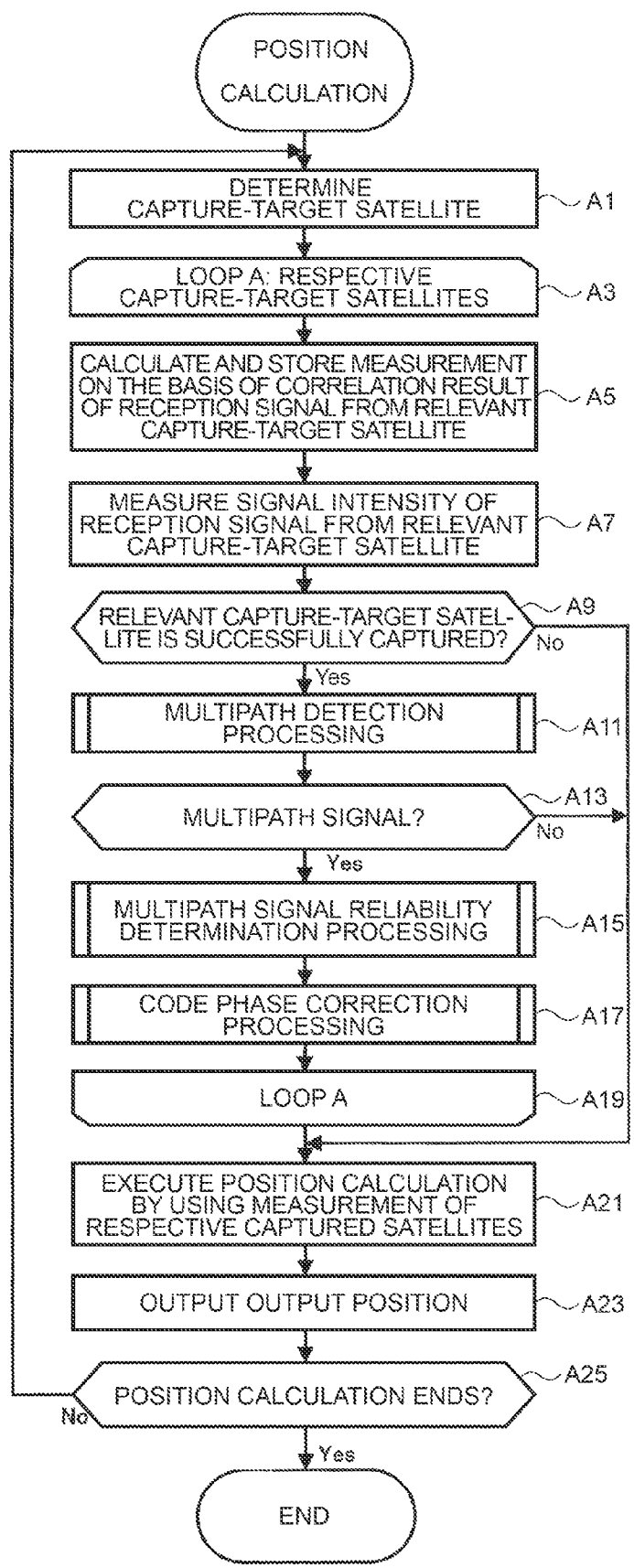
FIG. 35 is a flowchart showing a flow of position calculation processing.

FIG. 35 is a flowchart showing a flow of position calculation processing which is executed when the CPU 44 reads and executes the position calculation program 451 stored in the ROM 45.

First, the CPU 44 determines capture-target satellites on the basis of satellite trace information, such as almanac or ephemeris (Step A1). Then, processing of a loop A is executed for the respective determined capture-target satellites (Steps A3 to A19).

In the processing of the loop A, the CPU 44 causes the replica code generating unit 42 to generate replica code corresponding to C/A codes of the relevant capture-target satellite, calculates measurement on the basis of the correlation arithmetic result for the reception signal from the capture-target satellite input from the correlation arithmetic unit 43, and stores the measurement in the capture-target satellite data 462 of the relevant capture-target satellite (Step A5). That is, the reception frequency and phase are specified at which the correlation value becomes the peak correlation value, and are set as the measurement of the relevant capture-target satellite. In this case, the phase which is obtained as the measurement is a punctual phase which is considered to coincide with the above-described peak correlation value, and a phase which can include the code phase error ERR.

Next, the CPU 44 measures the signal intensity of the reception signal from the relevant capture-target satellite (Step A7). Then, the CPU 44 determines whether or not the relevant capture-target satellite is successfully captured (Step A9), and when it is determined to be successfully captured (Step A9: Yes), carries out multipath detection processing (Step A11).

Figure 36:
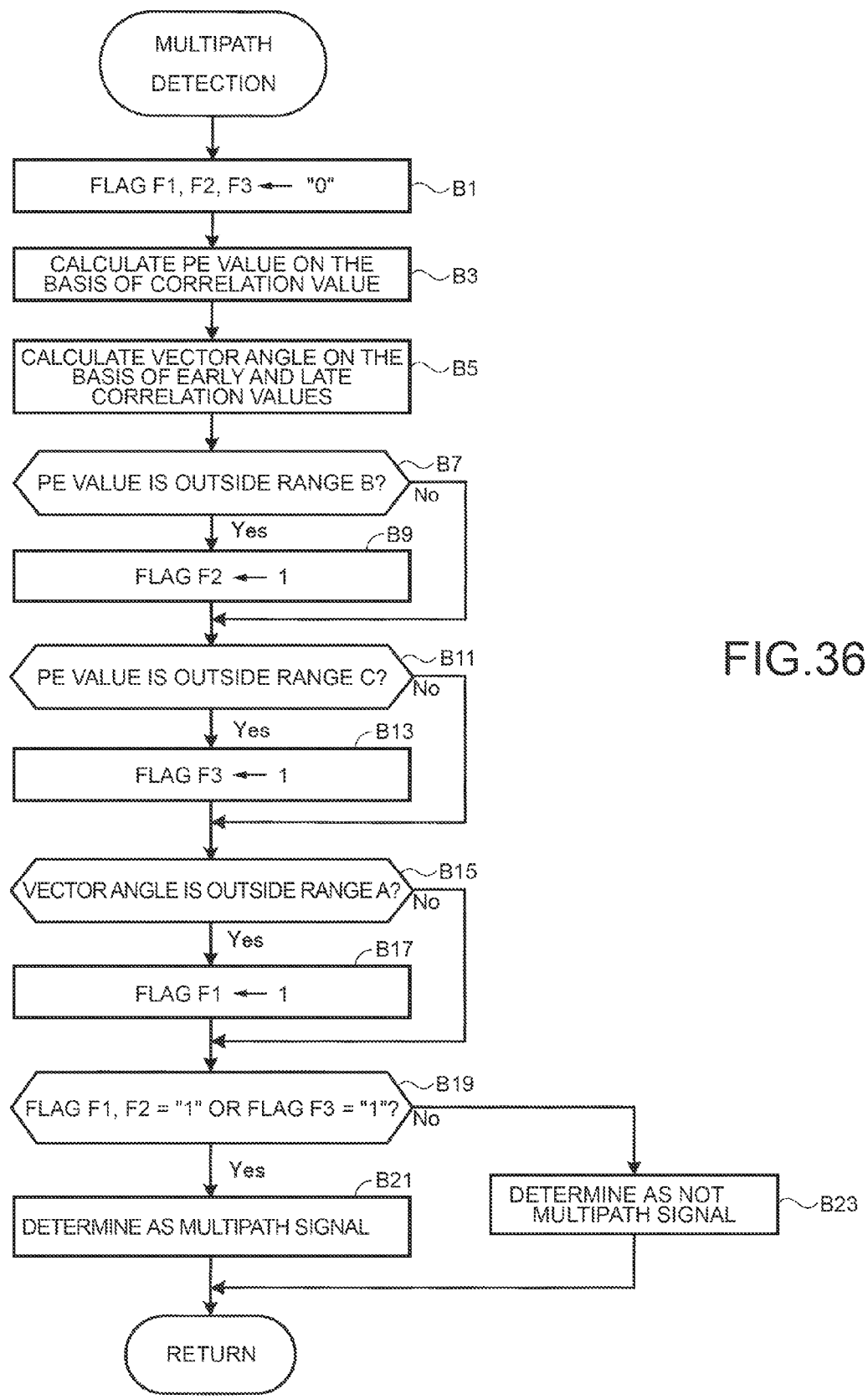
FIG. 36 is a flowchart showing a flow of multipath detection processing.

FIG. 36 is a flowchart showing a flow of multipath detection processing.

First, the CPU 44 initializes all the flags F1 to F3 to "0" (Step B1). Subsequently, the PE value is calculated on the basis of the correlation result for the reception signal from the relevant capture-target satellite output from the correlation arithmetic unit 43 (Step B3). Further, the vector angle θ is calculated on the basis of the early correlation value and the late correlation value input from the correlation arithmetic unit 43 (Step B5).

Next, the CPU 44 compares the calculated PE value with predetermined determination ranges B and C with reference to the flag determination range table 453 of the ROM 45, if the PE value is outside the determination range B (Step B7: Yes), sets the flag F2 to "1" (Step B9), and if the PE value is outside the determination range C (Step B11: Yes), sets the flag F3 to "1" (Step B13). Further, the CPU 44 compares the calculated vector angle θ with a predetermined determination range A, and if the vector angle θ is outside the determination range A (Step B15: Yes), sets the flag F1 to "1" (Step B17).

Next, the CPU 44 determines whether the reception signal from the capture-target satellites is a multipath signal or not on the basis of the set values of the flags F1 to F3. That is, if at least either "Condition A: the flags F1 and F2 are both "1"" or "Condition B: the flag F3 is "1"" is satisfied (Step B19: Yes), it is determined that the reception signal is a multipath signal (Step B21). If neither of the conditions are satisfied (Step B19: No), it is determined to be not a multipath signal (Step B23). If the above-described processing is carried out, the multipath detection processing ends.

Returning to the position calculation processing of FIG. 35, after the multipath detection processing is carried out, if it is determined that the reception signal from the relevant capture-target satellite is a multipath signal (Step A9: Yes), the CPU 44 carries out multipath signal reliability determination processing (Step A15).

Figure 37:
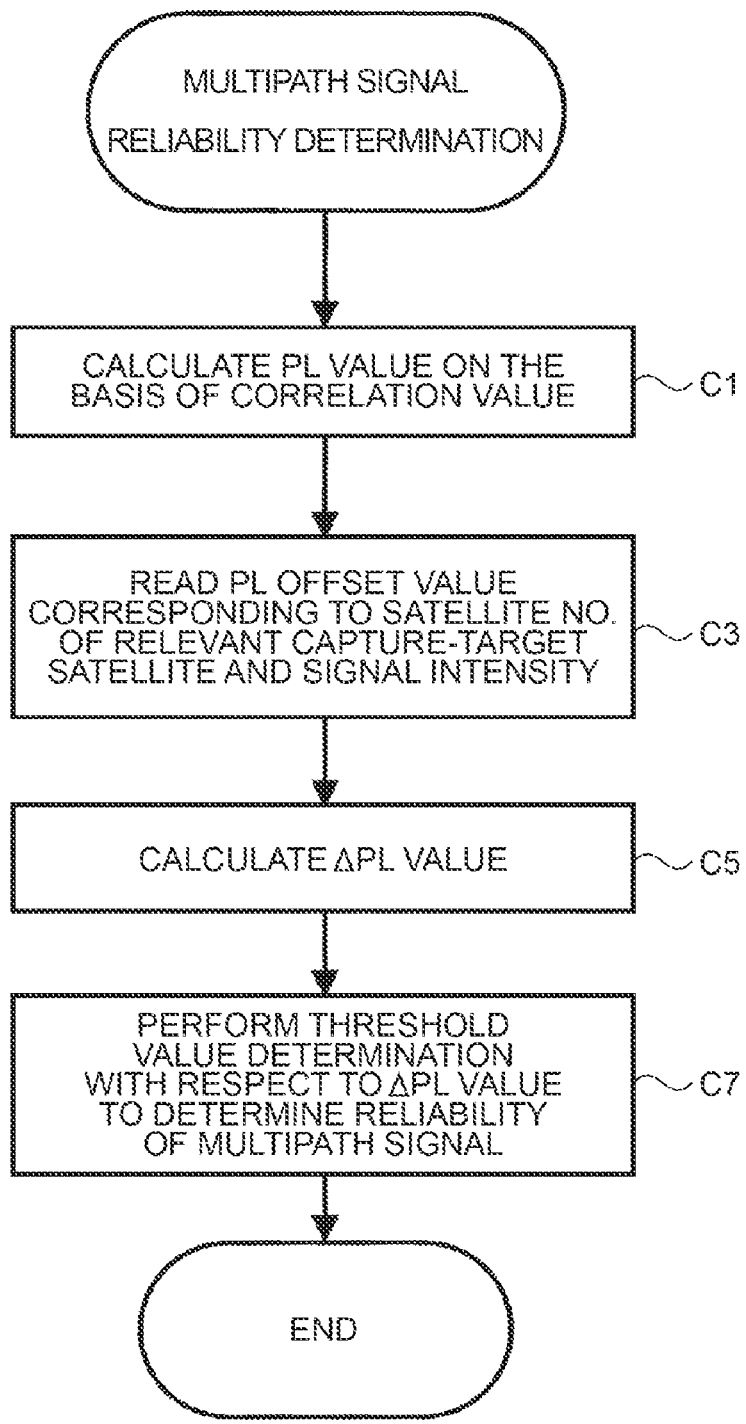
FIG. 37 is a flowchart showing a flow of multipath signal reliability determination processing.

FIG. 37 is a flowchart showing a flow of multipath signal reliability determination processing.

First, the CPU 44 calculates the PL value on the basis of the correlation result for the reception signal from the relevant capture-target satellite output from the correlation arithmetic unit 43 (Step C1). Then, the CPU 44 reads the PL offset value corresponding to the satellite number of the relevant capture-target satellite and the signal intensity of the reception signal from the relevant capture-target satellite measured in Step A7 with reference to the offset table 455 of the ROM 45 (Step C3).

Next, the CPU 44 subtracts the PL offset value read in Step C3 from the PL value calculated in Step C1 to calculate a ΔPL value (Step C5). Then, the CPU 44 carries out threshold value determination for the ΔPL value to determine the reliability of the multipath signal (Step C7). Specifically, in the case of ΔPL value≧threshold value, it is determined that the reliability is "high", and in the case of ΔPL value<threshold value, it is determined that the reliability is "low". Then, the CPU 44 ends the multipath signal reliability determination processing.

Returning to the position calculation processing of FIG. 35, after carrying out the multipath signal reliability determination processing, the CPU 44 carries out code phase correction processing (Step A17).

Figure 38:
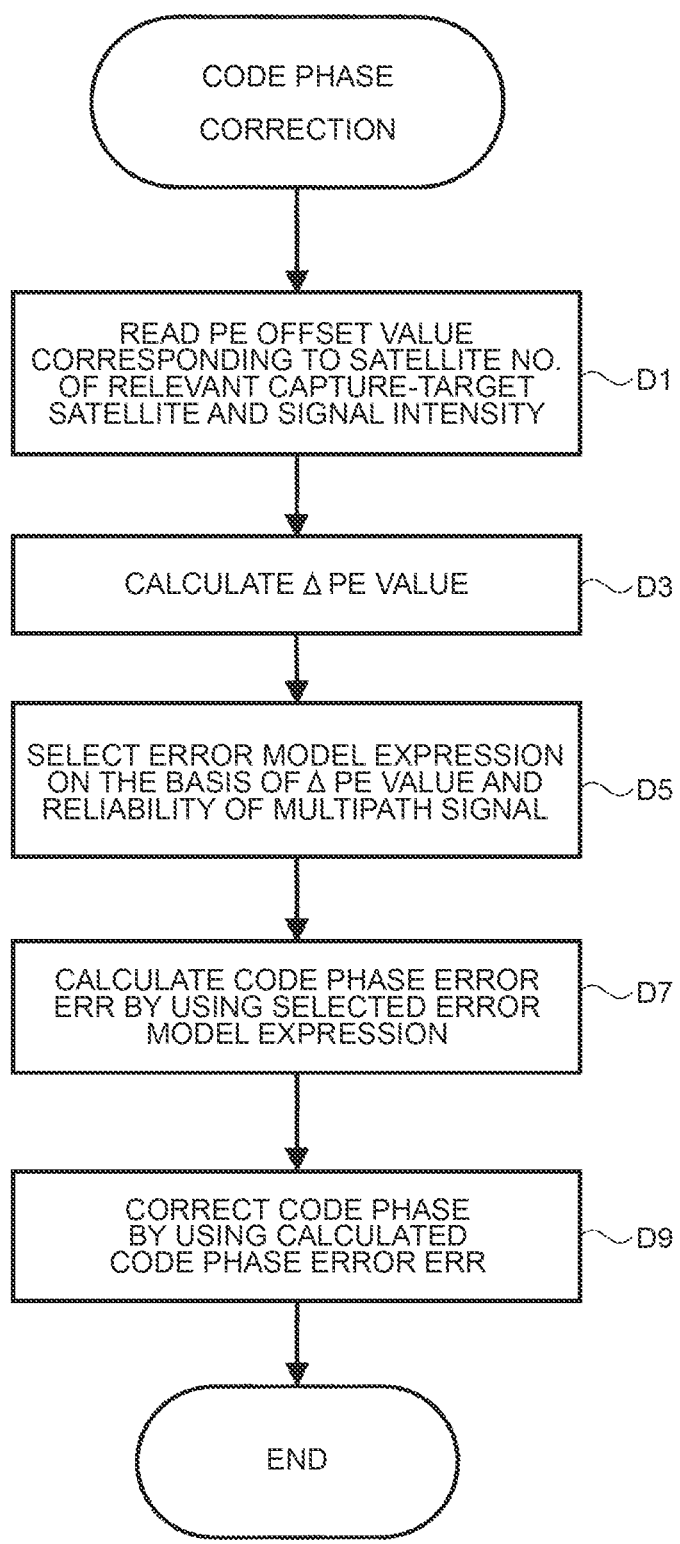
FIG. 38 is a flowchart showing a flow of code phase correction processing.

FIG. 38 is a flowchart showing a flow of code phase correction processing.

First, the CPU 44 reads the PE offset value corresponding to the satellite number of the relevant capture-target satellite and the signal intensity with reference to the offset table 455 of the ROM 45 (Step D1). Then, the CPU 44 subtracts the PE offset value read in Step D1 from the PE value calculated in Step B3 of the multipath detection processing to calculate the ΔPE value (Step D3).

Thereafter, the CPU 44 selects one error model expression on the basis of the ΔPE value calculated in Step D3 and the reliability of the multipath signal determined in Step C7 of the multipath signal reliability determination processing with reference to the error model expression table 457 of the ROM 45 (Step D5).

Next, the CPU 44 assigns the ΔPE value to the selected error model expression to calculate the code phase error ERR (Step D7). Then, the CPU 44 corrects the code phase by adding the code phase error ERR calculated in Step D7 to the code phase included in the measurement calculated in Step A5, and calculates the corrected code phase (Step D9). Then, the CPU 44 ends the code phase correction processing.

Returning to the position calculation processing of FIG. 35, after the code phase correction processing is carried out, the CPU 44 progresses to the next capture-target satellite. Then, if the processing of the loop A ends for all the capture-target satellites (Step A19), the CPU 44 executes position calculation to calculate the position of the mobile phone 1 by using the measurement of the respective tracked satellites (Step A21). In particular, the pseudo distance is calculated by using the corrected code phase and used for position calculation.

Then, the CPU 44 stores the calculated position in the RAM 46 as the output position 463, and outputs the output position 463 to the host CPU 51 (Step A23). Thereafter, the CPU 44 determines whether position calculation ends or not (Step A25), and if position calculation does not end (Step A25: No), returns to Step A1. If position calculation ends (Step A25: Yes), the position calculation processing ends.

1-4. Advantages

In the mobile phone 1, the correlation arithmetic unit 43 carries out the correlation calculation for multiplying the reception signal of the GPS satellite signal transmitted from the GPS satellite and the replica codes generated by the replica code generating unit 42 to calculate the correlation value. The CPU 44 calculates the PL value by using the peak correlation value obtained by the correlation calculation and a correlation value at a phase delayed from the peak phase representing the peak correlation value by M ($1 \leq M < 2$) chip, and determines the reliability of the multipath signal on the basis of the calculated PL value when the reception signal is a multipath signal.

Specifically, the CPU 44 measures the signal intensity of the received GPS satellite signal. Then, the CPU 44 reads the PL offset value corresponding to the GPS satellite which transmits the GPS satellite signal and the measured signal intensity from among the PL offset values determined by signal intensity for the respective GPS satellites. Then, the CPU 44 subtracts the PL offset value from the PL value to calculate the ΔPL value, and carries out threshold value determination for the ΔPL value to determine the reliability of the multipath signal.

A multipath signal is a signal where an indirect wave signal, such as reflection waves reflected by buildings, the ground, or the like, transmission waves transmitted through obstacles, or diffraction waves diffracted by obstacles, is superimposed on a direct wave signal which is the GPS satellite signal transmitted from the GPS satellite. The propagation distance of the indirect wave signal from the GPS satellite to the GPS receiver is longer than that of the direct wave signal. Thus, the indirect wave signal is delayed from the direct wave signal. For this reason, it is obvious experimentally that, when the reception signal is a multipath signal, the effect of the indirect wave signal appears significantly at a phase delayed from the peak phase, specifically, at a phase delayed from the peak phase by the amount equal to or larger than 1 chip and smaller than 2 chips, and the absolute value of the correlation value at the relevant phase becomes larger. Therefore, when observing the PL value calculated by using the peak correlation value and the correlation value at the phase delayed from the peak phase by the amount equal to or larger than 1 chip and smaller than 2 chips, the effect of the indirect wave signal on the direct wave signal can be grasped, and the quality of the multipath signal can be determined.

2. Second Example

In a second example, the mobile phone 1 selects a satellite signal (hereinafter, referred to as "satellite signal for use in position calculation") for use in position calculation by using the reliability of the multipath signal, and position calculation is carried out by using the selected satellite signal for use in position calculation.

2-1. Flow of Processing

Figure 39:
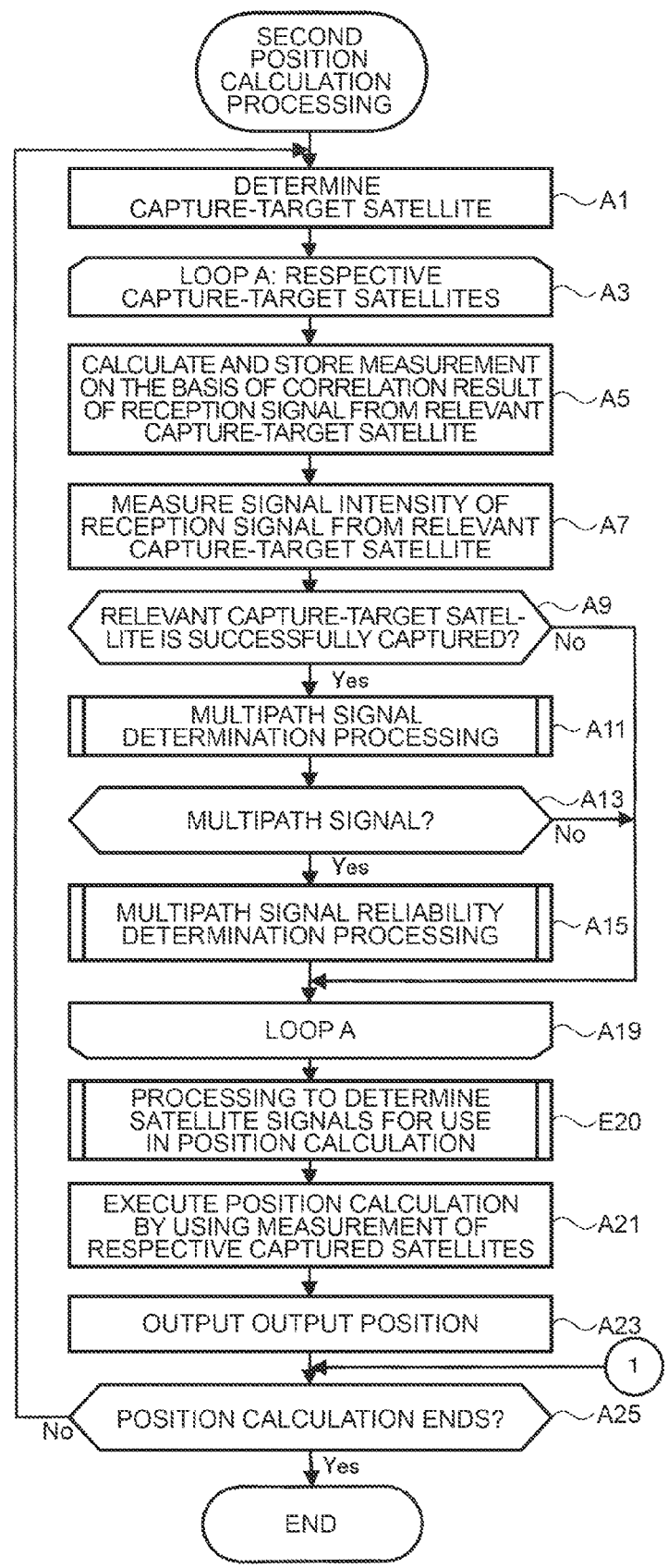
FIG. 39 is a flowchart showing a flow of second position detection processing.

FIG. 39 is a flowchart showing a flow of second position calculation processing which is carried out by the CPU 44 of the baseband processing circuit unit 40 in the second example. The same steps as those in the position calculation processing of FIG. 35 are represented by the same reference numerals, and description thereof will not be repeated. The description will be provided focusing on the different portions from the position calculation processing.

In the processing of the loop A, after carrying out the multipath signal reliability determination processing in Step A15, the CPU 44 progresses the process to the next capture-target satellite. Then, after the processing of the loop A is carried out for all the capture-target satellites, the CPU 44 carries out processing to determine satellite signals for use in position calculation (Step E20).

Figure 40:
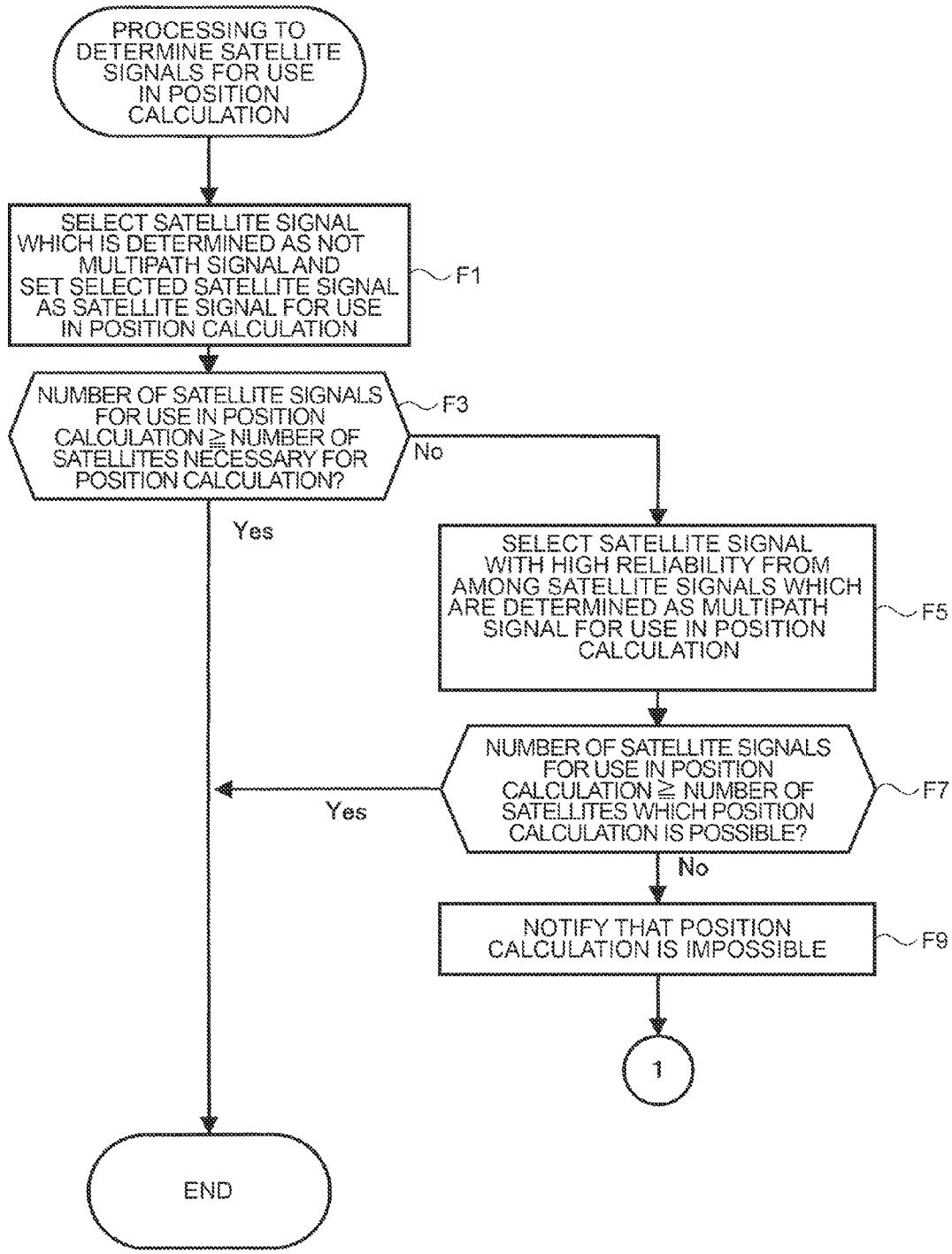
FIG. 40 is a flowchart showing a flow of processing to determine satellite signals for use in position calculation.

FIG. 40 is a flowchart showing a flow of processing to determine satellite signals for use in position calculation.

First, the CPU 44 selects a satellite signal, which is determined to be not a multipath signal, from among captured satellite signals, and sets the selected satellite signal as a satellite signal for use in position calculation (Step F1). That is, a satellite signal which is not a multipath signal is preferentially used for position calculation.

Next, the CPU 44 determines whether the number of satellite signals for use in position calculation has reached the number of satellites necessary for position calculation or not (Step F3). The number of satellites necessary for position calculation is four in the case of three-dimensional positioning to calculate the latitude, longitude, and altitude, and is three in the case of two-dimensional positioning to calculate the latitude and longitude. When it is determined that the number of satellite signals for use in position calculation has reached the number of satellites necessary for position calculation (Step F3: Yes), the CPU 44 ends the processing to determine satellite signals for use in position calculation.

Meanwhile, when it is determined in Step F3 that the number of satellite signals for use in position calculation has not reached the number of satellites necessary for position calculation (Step F3: No), the CPU 44 selects a satellite signal with "high" reliability from among satellite signals which are determined to be multipath signals, and adds the selected satellite signal to the satellite signals for use in position calculation (Step F5). When position calculation cannot be carried out only by using signals which are not determined to be multipath signals, position calculation is carried out by also using signals having high reliability from among signals which are determined to be multipath signals.

Next, the CPU 44 determines again whether the number of satellite signals for use in position calculation has reached the number of satellites necessary for position calculation or not (Step F7), and when it is determined that the number of satellite signals for use in position calculation has reached the number of satellites necessary for position calculation (Step F7: Yes), ends the processing to determine satellite signals for use in position calculation. When it is determined that the number of satellite signals for use in position calculation has not reached the number of satellites necessary for position calculation (Step F7: No), a message indicating the position calculation cannot be carried out is transmitted to the host CPU 51 (Step F9), and the process progresses to Step A25.

2-2. Advantages

In the second example, when the number of signals, which are determined to be not a multipath signal, from among the captured GPS satellite signals does not each the number of satellites necessary for position calculation, position calculation is carried out by also using satellite signals having high reliability from among the satellite signals which are determined to be multipath signals. Therefore, even in an environment where many reception signals become multipath signals like the urban canyon environment which is surrounded by tall buildings, position calculation can be carried out by using signals having high reliability from among the signals.

3. Modification

The invention is not limited to the above-described embodiment, but may be appropriately changed without departing from the scope and spirit of the invention.

3-1. Electronic Apparatus

Although in the foregoing examples, a case where the invention is applied to a mobile phone which is a kind of electronic apparatus has been described, the invention may be similarly applied to other electronic apparatuses, such as a car navigation system, a portable navigation system, a personal computer, a PDA (Personal Digital Assistant), and a wristwatch.

3-2. Satellite Position Calculation System

Although in the foregoing embodiment, a case where the GPS is used has been described, for example, the invention may be similarly applied to other satellite positioning systems, such as GALILEO using the CDMA system similarly to the GPS. In addition, in addition to the satellite positioning system, the invention may be applied to a system which transmits signals modulated by a direct spectrum spread system, such as a system which uses wireless signals of a wireless LAN based on the IEEE 802.11b standard.

3-3. Subject of Processing

Although in the above-described examples, a case where the CPU 44 of the baseband processing circuit unit 40 carries out the position calculation processing has been described, the host CPU 51 may carry out the position calculation processing. The CPU 44 and the host CPU 51 may share processing, for example, the CPU 44 may carry out the multipath detection processing, the multipath signal reliability determination processing, and the code phase correction processing, and the host CPU 51 may carry out position calculation.

3-4. Determination of Multipath Signal

Although in the foregoing embodiment, when at least one of the two conditions (Conditions A and B) is satisfied, it is determined that the reception signal is a multipath signal, determination may be made by using one condition. In this case, the determination ranges A, B, and C may be determined to become larger or smaller.

3-5. PE Value and PL Value

Although in the foregoing embodiment, FIG. 8 illustrates the calculation method of the PE value, and FIG. 18 illustrates the calculation method of the PL value, the calculation methods of the PE value and the PL value may be carried out as follows.

Figure 41:
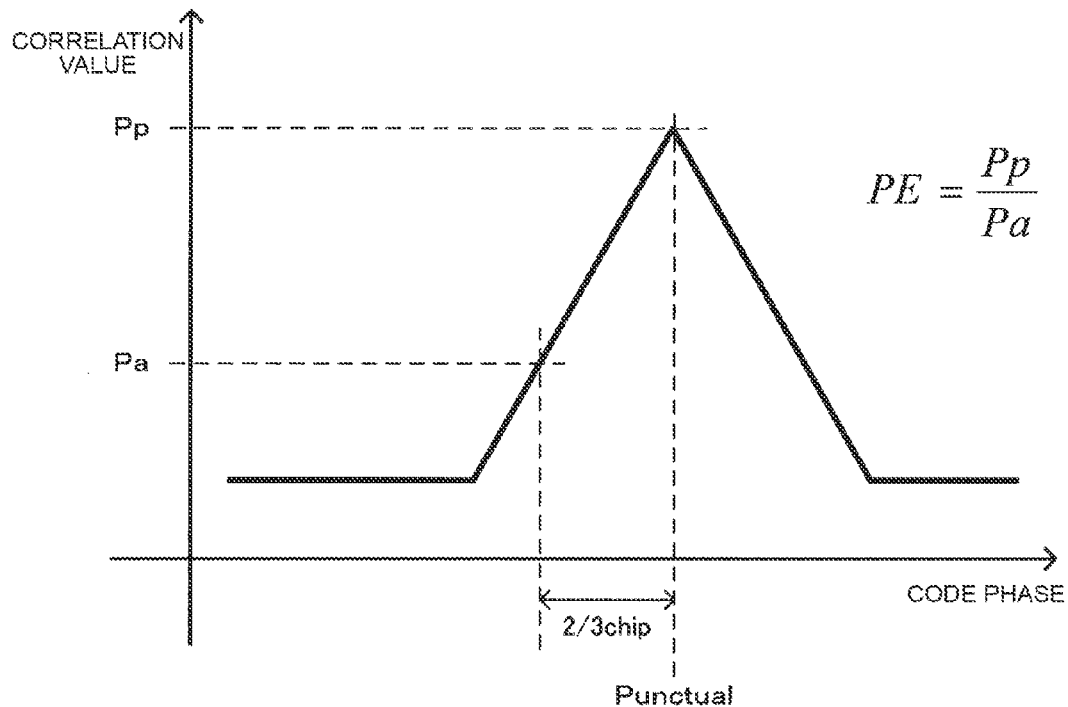
FIG. 41 is an explanatory view illustrating a calculation method of a PE value according to a modification.

FIG. 41 is an explanatory view illustrating a calculation method of a PE value according to the modification. Although in FIG. 8, the PE value is calculated by using the punctual correlation value Pp, the correlation value Pn at the phase advance from the punctual phase by 1 chip or larger, and the correlation value Pa at the phase advanced from the punctual phase by N chip, the PE value may be calculated by Equation (7), without using the correlation value Pn.

$$PE=Pp/Pa \tag{7}$$

Figure 42:
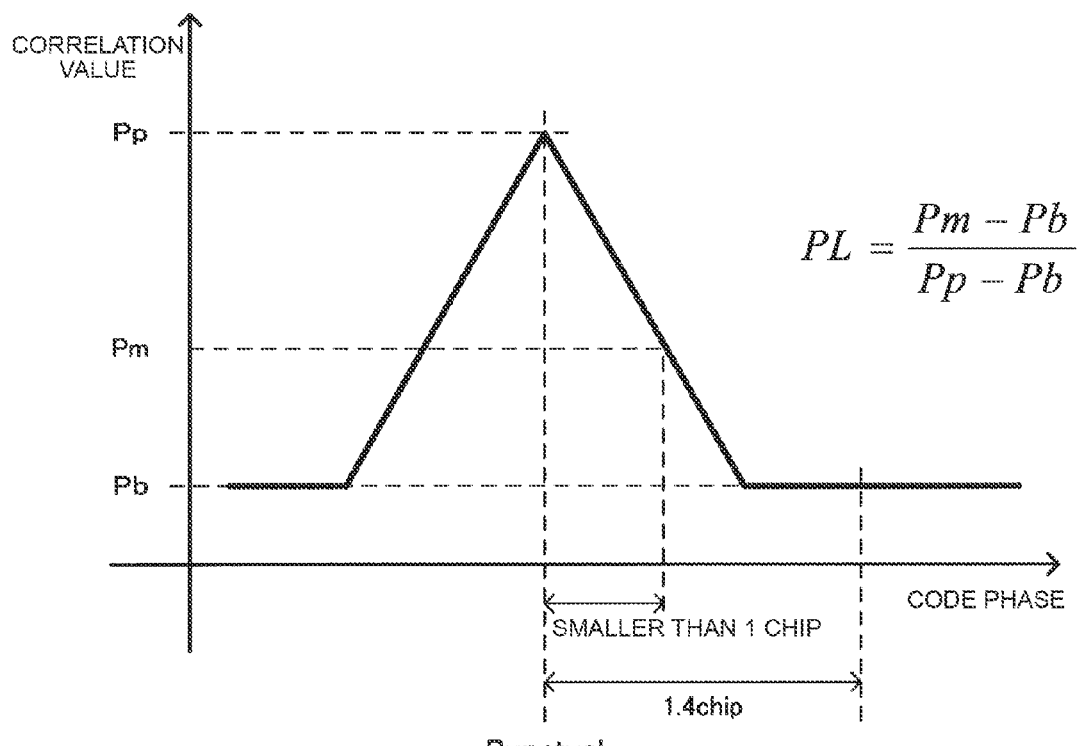
FIG. 42 is an explanatory view illustrating a calculation method of a PL value according to a modification.

FIG. 42 is an explanatory view illustrating a calculation method of a PL value according to a modification. Although in FIG. 18, the PL value is calculated by using the punctual correlation value Pp and the correlation value Pb at the phase delayed from the punctual phase by M chip, the PL value may be calculated by Equation (8) by also using a correlation value Pm at a phase delayed from the punctual phase by smaller than 1 chip.

$$PL=(Pm-Pb)/(Pp-Pb) \tag{8}$$

3-6. Error Model Expression

Although in the foregoing embodiment, a case where the error model expression representing the relationship between the ΔPE value and the code phase error ERR is approximated by a linear function has been described, the error model expression may be approximated by various functions, such as a function with a power of two or more, an exponential function, a logarithmic function, and the like.

The inventors have execute a numerical experiment and have found that, in determining an error model expression, if function fitting is simply carried out using a least-squares method to determined an error model expression, the code phase error ERR (a calculated error of the code phase) calculated from the error model expression becomes larger than an error (an actual error of the code phase) actually included in the code phase, and correction may be made strongly. Thus, an error model expression may be determined such that the correction amount of the code phase becomes smaller. For example, a method may be used in which an error model expression obtained by using a least-squares method is shifted such that the correction amount of the code phase becomes smaller.

3-7. Determination of Position Calculation Satellite

Although in the second example, a case where the satellite signals for use in position calculation are determined by using the reliability of the multipath signal has been described, the satellite signals for use in position calculation may be determined by using signal intensity of the reception signal, the angle of elevation of the satellite, or the like, together with the reliability of the multipath signal.

For example, in Step F5 of FIG. 40, when a satellite signal, which is to be added to the satellite signal for use in position calculation, is selected from among the multipath signals, a satellite signal having large signal intensity or a satellite signal transmitted from a GPS satellite having a high angle of elevation may be preferentially selected from among the satellite signal having "high" reliability, and may be added to the satellite signals for use in position calculation.

3-8. Multipath Signal Reliability

Although in the foregoing embodiment, a case where, when the ΔPL value is equal to or larger than the threshold value, it is determined that the reliability of the multipath signal is "high", and when the ΔPL value is smaller than the threshold value, it is determined that the reliability of the multipath signal is "low" has been described, the reliability may be determined in more detail. It should suffice that the reliability becomes higher as the ΔPL value is larger. Thus, a plurality threshold values for reliability determination may be set, and reliability determination may be carried out in three or more steps.

In this case, a plurality of error model expressions according to the difference in reliability are determined in advance, when the reception signal is a multipath signal, an error model expression according to the reliability of the relevant multipath signal is selected, and used for correction of the code phase. Further, in determining satellite signals for use in position calculation on the basis of the reliability of the multipath signal, satellite signals may be added to the position calculation-use satellite signal in order from satellite signals having higher reliability.

What is claimed is:

1. A multipath signal evaluation method comprising:
   carrying out a correlation calculation on a received signal from a positioning satellite to obtain a peak correlation value; and
   determining reliability for a received multipath signal by using a ratio of a correlation value at a late phase from a peak phase to the peak correlation value at the peak phase.

2. The multipath signal evaluation method according to claim 1,
   wherein the late phase is delayed from the peak phase by 1 chip or more but less than 2 chips.

3. The multipath signal evaluation method according to claim 1, further comprising:
   determining whether the multipath signal with respect to a directly-received signal is in a state of heightening or lowering the correlation value based on the peak correlation value and a correlation value at an early phase from the peak phase; and
   calculating error included in a code phase obtained as a result of the correlation calculation using an error calculation method determined in accordance with the reliability and the determined state.

4. The multipath signal evaluation method according to claim 3, further comprising:
   calculating a corrected code phase for the obtained code phase using the error.

5. A position calculation method comprising:
   receiving satellite signals from a plurality of positioning satellites;
   carrying out the multipath signal reliability determination method according to claim 1 on received satellite signals;
   selecting a satellite signal from among the received satellite signals for use in a position calculation based on the reliability obtained by carrying out the multipath signal reliability determination method; and
   carrying out the position calculation using the selected signal.

6. The multipath signal evaluation method according to claim 3, wherein the state of heightening or lowering the correlation value of the multipath signal is determined based on the change in the ratio of the correlation value at the late phase from the peak phase to the peak correlation value at the peak phase with respect to time.

7. A multipath signal evaluation device comprising:
   a correlator that carries out a correlation calculation on a satellite signal transmitted from a positioning satellite; and
   a determination unit that determines reliability for a received multipath signal by using a ratio of a correlation value at a late phase from a peak phase to the peak correlation value at the peak phase.

8. The multipath signal evaluation method according to claim 6, wherein the multipath signal is determined to be in a state of heightening when the ratio of the correlation value at the late phase from the peak phase to the peak correlation value at the peak phase with respect to time is greater than a predetermined threshold value.

* * * * *